(12) United States Patent
Wang et al.

(10) Patent No.: US 12,086,850 B2
(45) Date of Patent: Sep. 10, 2024

(54) METHOD FOR GENERATING BILLING INFORMATION, TERMINAL, SERVER, AND SYSTEM

(71) Applicant: BOE TECHNOLOGY GROUP CO., LTD., Beijing (CN)

(72) Inventors: Yiran Wang, Beijing (CN); Weiguo Li, Beijing (CN); Jianli Yao, Beijing (CN); Haiyan Wan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 525 days.

(21) Appl. No.: 17/298,091

(22) PCT Filed: May 14, 2020

(86) PCT No.: PCT/CN2020/090230
§ 371 (c)(1),
(2) Date: May 28, 2021

(87) PCT Pub. No.: WO2020/228771
PCT Pub. Date: Nov. 19, 2020

(65) Prior Publication Data
US 2022/0020068 A1    Jan. 20, 2022

(30) Foreign Application Priority Data
May 14, 2019    (CN) .......................... 201910399315.0

(51) Int. Cl.
*G06Q 30/04*    (2012.01)
*H04W 4/02*    (2018.01)
(Continued)

(52) U.S. Cl.
CPC ............ *G06Q 30/04* (2013.01); *H04W 4/023* (2013.01); *H04W 4/029* (2018.02); *H04W 4/42* (2018.02)

(58) Field of Classification Search
CPC ...... G06Q 30/04; H04W 4/023; H04W 4/029; H04W 4/42; H04W 4/20; H04W 4/44; H04W 4/80
See application file for complete search history.

(56) References Cited

U.S. PATENT DOCUMENTS 10,332,162 B1 * 6/2019 Brock ................ G06Q 30/0284
2016/0124794 A1 * 5/2016 Chen .................... G06F 11/0751
714/37
(Continued)

FOREIGN PATENT DOCUMENTS

CN    102890832 A    1/2013
CN    105894272 A    8/2016
(Continued)

OTHER PUBLICATIONS

International Search Report and Written Opinion for International Application No. PCT/CN2020/090230 mailed Aug. 21, 2020.
(Continued)

*Primary Examiner* — A. Hunter Wilder
(74) *Attorney, Agent, or Firm* — XSENSUS LLP

(57) ABSTRACT

Disclosed are a method for generating billing information, a terminal, a server, and a billing system. The method for generating billing information comprises: receiving an end billing request transmitted by a terminal, the end billing request comprising location information of the terminal and bus information; and executing, on the basis of the location information of the terminal and of the bus information, an end billing operation with respect to a first terminal from which the distance to a bus is greater than a distance threshold.

10 Claims, 11 Drawing Sheets receiving an end billing request sent by a terminal, and the end billing request includes location information of the terminal and bus information — S110 performing an end billing operation for a first terminal from which a distance to the bus is greater than a distance threshold according to the location information of the terminal and the bus information, and generating the billing information — S120

(51) Int. Cl.
*H04W 4/029* (2018.01)
*H04W 4/42* (2018.01)

(56) References Cited

U.S. PATENT DOCUMENTS

| | | |
|---|---|---|
| 2018/0137487 A1 | 5/2018 | Wang |
| 2019/0039473 A1 | 2/2019 | Takehara et al. |
| 2019/0188666 A1 | 6/2019 | Wang |
| 2021/0056535 A1* | 2/2021 | Xu ..................... G06Q 20/326 |

FOREIGN PATENT DOCUMENTS

| | | |
|---|---|---|
| CN | 108492098 A | 9/2018 |
| CN | 108551651 A | 9/2018 |
| CN | 109168130 A | 1/2019 |
| CN | 109658202 A | 4/2019 |
| CN | 109685492 A | 4/2019 |
| CN | 109685577 A | 4/2019 |
| CN | 110113710 A | 8/2019 |
| EP | 3539067 A1 | 9/2019 |
| IN | 106651337 A | 5/2017 |
| IN | 108834048 A | 11/2018 |
| WO | 2018089446 A1 | 5/2018 |

OTHER PUBLICATIONS

First Office Action for CN Patent Application No. 201910399315.0 mailed Jul. 22, 2020.
Notice of Allowance for CN Patent Application No. 201910399315.0 mailed Oct. 20, 2021.

* cited by examiner

METHOD FOR GENERATING BILLING INFORMATION, TERMINAL, SERVER, AND SYSTEM

CROSS-REFERENCE TO RELATED APPLICATION

The present application is a national phase application under 35 U.S.C. § 371 based upon International Application No. PCT/CN2020/090230, filed on May 14, 2020, which claims the benefit of and priority to Chinese Patent Application No. 201910399315.0, filed on May 14, 2019, the entire contents of which are hereby incorporated by reference as a part of the present application.

TECHNICAL FIELD

The present disclosure relates to, but is not limited to, the field of communication technologies and, in particular, to a method for generating billing information, and a terminal, a server, and a system.

BACKGROUND

With the development of communication technologies, near field communication (NFC) has been widely used in people's daily life due to its safety, convenience, and low power consumption characteristics.

NFC technology is a short-distance and high-frequency wireless communication method that may realize identification and data interaction with compatible devices within a short distance. Common applications include swiping a bus card when taking a bus and an access control card. A current public transportation billing method using the NFC technology is to perform NFC card swiping operations when a passenger get on and off the bus, and charge according to the number of stations or distance traveled between two NFC card swiping operations when getting on and off the bus. According to the related art, the passenger needs to swipe the card at the beginning and end of the travel to determine the beginning and end of the travel. It should be noted that the information disclosed in the background art section above is only used to enhance the understanding of the background of the present disclosure, and therefore may include information that does not constitute the prior art known to those of ordinary skill in the art.

SUMMARY

Embodiments of the present disclosure provide a method for generating billing information, and a terminal, a server, and a system.

The embodiments of the present disclosure provide a method for generating billing information, including:
  receiving an end billing request sent by a terminal, wherein the end billing request includes location information of the terminal and public transportation means information; and
  performing an end billing operation for a first terminal from which a distance to the public transportation means is greater than a distance threshold according to the location information of the terminal and the public transportation means information, and generating the billing information.

Optionally, in the method as described above, the performing the end billing operation for the first terminal from which the distance to the public transportation means is greater than the distance threshold according to the location information of the terminal and the public transportation means information, and generating the billing information includes:
  obtaining location information of the public transportation means according to the public transportation means information;
  determining whether the distance between the terminal and the public transportation means is greater than the distance threshold according to the location information of the terminal and the location information of the public transportation means; and
  performing the end billing operation for the first terminal from which the distance to the public transportation means is greater than the distance threshold.

Optionally, in the method as described above, after the receiving the end billing request sent by the terminal, the method further includes:
  determining whether the terminal sending the end billing request has an unfinished travel;
  the performing the end billing operation for the first terminal includes:
  performing the end billing operation for the first terminal which is determined to have the unfinished travel and from which the distance to the public transportation means is greater than the distance threshold.

Optionally, in the method as described above, the method further includes:
  sending billing result information to the terminal, wherein the billing result information includes end billing information sent to the first terminal and a refusal end billing message sent to a second terminal from which a distance to the public transportation means is less than or equal to the distance threshold.

The embodiments of the present disclosure also provide a method for generating billing information, including:
  receiving travel end information sent by a card machine in a public transportation means, wherein the travel end information includes information of a terminal which has performed a card swiping operation for getting on the public transportation means; and
  querying a terminal that has not been in the public transportation means and not performed the card swiping according to the travel end information, and ending a current travel of the terminal and generating the billing information.

Optionally, in the method as described above, the method further includes:
  sending end billing information to the terminal, so that the terminal clears stored public transportation means information according to the end billing information, and deducts cost for the current travel.

The embodiments of the present disclosure also provide a method for generating billing information, including:
  sending an end billing request to a server, wherein the end billing request includes location information of a terminal and public transportation means information, and the public transportation means information is information in a current travel of the terminal; and
  receiving billing result information returned by the server, and generating the billing information, wherein the billing result information includes end billing information or a refusal end billing message, and the end billing information is sent to the terminal after it is determined that a distance between the terminal and the public transportation means is greater than a distance threshold according to the location information of the terminal and the public transportation means information and end billing operation is performed for the terminal by the server.

Optionally, in the method as described above, before the sending the end billing request to the server, the method further includes:

performing a card swiping operation for getting on the public transportation means, and storing the public transportation means information; and monitoring whether the terminal is not in the public transportation means and does not perform the card swiping in real time through a triggering of the card swiping operation for getting on the public transportation means.

Optionally, in the method as described above, the monitoring whether the terminal is not in the public transportation means and does not perform the card swiping in real time includes:

reading the stored public transportation means information in real time;

obtaining the location information of the terminal when the public transportation means information is read, and obtaining location information of the public transportation means from the server;

determining that the terminal is not in the public transportation means and does not perform the card swiping when the distance between the terminal and the public transportation means is greater than the distance threshold.

Optionally, in the method as described above, the method further includes:

displaying a prompt message for indicating that the terminal is not in the public transportation means and does not perform the card swiping.

The embodiments of the present disclosure also provide a server, including: a memory and a processor;

the memory is configured to store executable instructions;

the processor is configured to, when executing the executable instructions stored in the memory, implement any one of the methods for generating billing information executed by the server described above.

The embodiments of the present disclosure also provide a terminal, including: a memory and a processor;

the memory is configured to store executable instructions;

the processor is configured to, when executing the executable instructions stored in the memory, implement any one of the methods for generating billing information executed by the terminal described above.

The embodiments of the present disclosure also provide a billing system, including: the server according to any one of the above, the terminal according to any one of the above, and a card machine in a public transportation means;

the card machine in the public transportation means is configured to write public transportation means information to a terminal that performs a card swiping operation for getting on the public transportation means, and delete stored public transportation means information from a terminal that performs a card swiping operation for getting off the public transportation means;

the card machine in the public transportation means is also configured to upload information that the terminal performs the card swiping operation for getting on the public transportation means, and the card swiping operation for getting off the public transportation means to the server.

The embodiments of the present disclosure also provide a computer-readable storage medium having executable instructions stored thereon, which, when executed by a processor, implement any one of the methods for generating billing information executed by the server described above, or implement any one of the methods for generating billing information executed by the terminal described above.

It should be noted that the above general description and the following detailed description are merely exemplary and explanatory and should not be construed as limiting of the disclosure.

This section provides an overview of various implementations or examples of the technologies described in the present disclosure, and is not a comprehensive disclosure of the full scope or all features of the disclosed technologies.

BRIEF DESCRIPTION OF THE DRAWINGS

The accompanying drawings are used for providing a further understanding of technical solutions of the present disclosure, and constitute a part of the specification. Together with embodiments of the present disclosure, the accompanying drawings are used to explain the technical solutions of the present disclosure, and do not constitute a limitation to the technical solutions of the present disclosure.

DETAILED DESCRIPTION

In order to make objectives, technical solutions, and advantages of the present disclosure more clear, embodiments of the present disclosure will be described in detail below with reference to accompanying drawings. It should be noted that the embodiments in the present disclosure and features in the embodiments may be combined with each other arbitrarily if there is no conflict.

Steps shown in a flowchart of the accompanying drawings may be executed in a computer system such as a set of computer-executable instructions. In addition, although a logical sequence is shown in the flowchart, in some cases, the steps shown or described may be performed in a different order than here.

The following specific embodiments provided by the present disclosure may be combined with each other, and the same or similar concepts or processes may not be repeated in some embodiments.

Hereinafter, the present disclosure will be explained in detail by taking a bus as an example. However, those skilled in the art should understand that an application of the present disclosure is not limited to a city bus in the general sense, but may be applied to other public transportation means that need a card swiping operation for getting on and off the public transportation means to calculate a travel, such as a rail/trolley bus, a city railway, a sightseeing car and so on.

Figure 1:
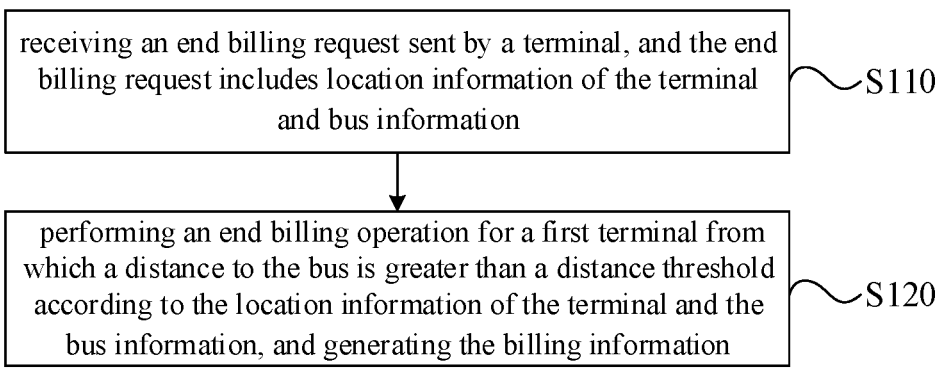
FIG. 1 is a flowchart of a method for generating billing information provided by an embodiment of the disclosure.

FIG. 1 is a flowchart of a method for generating billing information provided by an embodiment of the disclosure. According to an application scenario of the present disclosure, the present disclosure may be applied to a city bus system to generate the billing information according to an actual distance and/or time the user takes a city bus, so as to obtain cost information that is consistent with an actual usage of the user, that is, the present disclosure may be used to bill the user. Correspondingly, a system for generating billing information involved in other embodiments, for example, may be referred to as a "a billing system" for short. The method for generating billing information provided by the embodiments is applicable to a case in which a passenger takes a bus and charge for the passenger's travel. The method for generating billing information may be executed by a server for billing a travel, and the server generates the billing information through communication with a terminal that performs a card swiping operation used by the passenger. As shown in FIG. 1, the method for generating billing information provided by the embodiments of the present disclosure may include the following steps.

In S110, an end billing request sent by a terminal is received, and the end billing request includes location information of the terminal and bus information.

The method for generating billing information provided by the embodiments of the present disclosure is a processing manner in which the server configured to perform bus billing performs a travel billing for the passenger based on a condition of getting on and off the bus at a passenger side. A way for the server to become aware of the condition of getting on and off the bus at the passenger side may be based on a card swiping operation for getting on the bus and/or a card swiping operation for getting off the bus performed by a bus swiping terminal used by the passenger. For example, if the terminal used by the passenger has performed the card swiping operation for getting on the bus, and does not perform the card swiping operation for getting off the bus, it is considered that the passenger is currently on the bus where the passenger has swiped the card. In another example, the terminal used by the passenger has performed the card swiping operation for getting on the bus, and also performed the card swiping operation for getting off the same bus, it is considered that the passenger has completed the bus travel. In yet another example, in a case where the terminal used by the passenger has a record of the card swiping operation for getting on the bus during a previous bus travel while the card swiping operation for getting off the bus is not performed during the previous bus travel, and a current card swiping operation for getting on the bus during a current travel is performed, it is considered that the card swiping operation for getting off the bus during the previous bus travel has been forgot to be performed. At this time, the previous bus travel is usually charged for a cost of a whole travel of the bus to end the previous travel, so as to record the current bus travel. In the above various application scenarios, for a case in which the passenger performs the card swiping operation for getting on the bus, but does not perform the card swiping operation for getting off the bus, the server will charge the previous travel for the cost of the whole travel of the bus when the passenger uses the terminal to perform the card swiping operation for getting on a bus next time, that is, initiating a new bus travel, which causes relatively large economic losses to the passenger.

It should be noted that the terminal configured to perform bus card swiping in the embodiments of the present disclosure is, for example, a mobile phone with a NFC function, which realizes the card swiping operation by installing an application (or "APP" for short) in the mobile phone which performs swiping interactive operations with a bus card machine and the server, and also realizes the billing through the information interaction with the server. The APP in the mobile phone is enabled, and the mobile phone approaches the bus card machine to perform the card swiping operation for getting on/off the bus. A program that is configured to perform the card swiping operation for getting on/off the bus may also be a mini program in an existing APP in the mobile phone, for example, a travel code in WeChat or Alipay. In addition, the terminal configured to perform bus card swiping in the embodiments of the present disclosure may also be used in conjunction with an NFC bus card and a mobile phone. For example, if the mobile phone does not have the NFC function, the NFC bus card may be used to get on and off the bus and swipe the card. In the way of binding the NFC bus card in the mobile phone APP, the billing is realized by the information interaction between the mobile phone and the server.

In the embodiments of the present disclosure, the terminal configured to perform the bus card swiping may perform the information interaction with the server, and the server may receive the end billing request actively sent by the terminal. The end billing request may be an end billing request sent to the server through an operation performed on the terminal side in a case where the passenger finds that he/she does not perform the card swiping when he/she has got off the bus. The operation performed on the terminal side by the passenger is, for example, clicking on an option of forcibly ending billing in the APP of the mobile phone.

In S120, according to the location information of the terminal and the bus information, an end billing operation is performed for a first terminal from which a distance to the bus is greater than a distance threshold.

In the embodiments of the present disclosure, considering a false operation of the passenger using the terminal to send the end billing request, for example, some passengers use the terminal to click the option of forcibly ending the billing without getting off the bus. A way to end the billing may be set as follows: after receiving the end billing request, the server may first determine whether the terminal that sent the request meets a condition for ending the billing. For example, it is determined whether the terminal that sent the request meets the condition for ending the billing based on a distance between the terminal and the bus.

Based on a demand for the server to determine whether the terminal meets the condition for ending the billing, the end billing request sent by the terminal in the embodiments of the present disclosure may carry current location information of the terminal to provide the server with basic information for determination. In addition, when the terminal performs the card swiping operation for getting on the bus, the bus card machine may write the bus information into the terminal through the NFC communication with the terminal, and the end billing request sent by the terminal may also carry the stored bus information, the bus information includes, for example, a bus line name, a license plate number, and a number of the bus card machine. Since the bus moves in real time, the server may learn the current location information of the bus based on the bus information, thereby determining whether the terminal meets the condition for ending the billing according to the location information of the bus and the location information of the terminal. For example, the distance between the terminal and the bus may be determined based on the location information of the terminal and the bus information. When the distance between the bus and the terminal is greater than a set distance threshold which may be set to not less than a length of the bus, and the passenger is considered to have got off the bus.

The distance threshold in the embodiments of the present disclosure may be distance information set in the server to determine whether the passenger has got off the bus. Due to different bus models, different distance thresholds may be set for different buses. The distance threshold may also be presented in the bus information in the end billing request sent by the terminal. For example, if the bus information has a bus model, the server may determine an appropriate distance threshold according to the bus model to determine whether the passenger has got off the bus.

It should be noted that in the embodiments of the present disclosure, there may be multiple terminals that send end billing requests to the server. Some of these terminals meet the condition for ending the billing, while some do not. Each embodiment of the present disclosure will define a terminal that meets the condition for ending the billing determined by the server as a first terminal, and the first terminal is a terminal that sends the end billing request to the server and the distance between it and the bus is greater than the distance threshold.

According to the method for generating billing information provided by the embodiments of the present disclosure, the server performs an end billing operation for the first terminal from which the distance to the bus is greater than the distance threshold according to the location information of the terminal and the bus information in the request by receiving the end billing request including the location information of the terminal and the bus information sent by the terminal. For a passenger who takes the bus and forgets to swipe the card when getting off the bus, the method for generating billing information provided by the embodiments of the present disclosure does not deduct the full-course travel fee. Instead, according to a location where the passenger forces to end the billing (that is, the location information of the terminal in the end billing request sent by the terminal), a cost of the corresponding station or the mileage is deducted. Compared with a billing method of deducting the full-course travel fee for the passenger who takes the bus and forgets to swipe the card when getting off the bus in the related art, the method for generating billing information provided by the embodiment of the present disclosure may greatly reduce the economic loss caused by the passenger getting off the bus and forgetting to swipe the card, and has a great market prospect.

Figure 2:
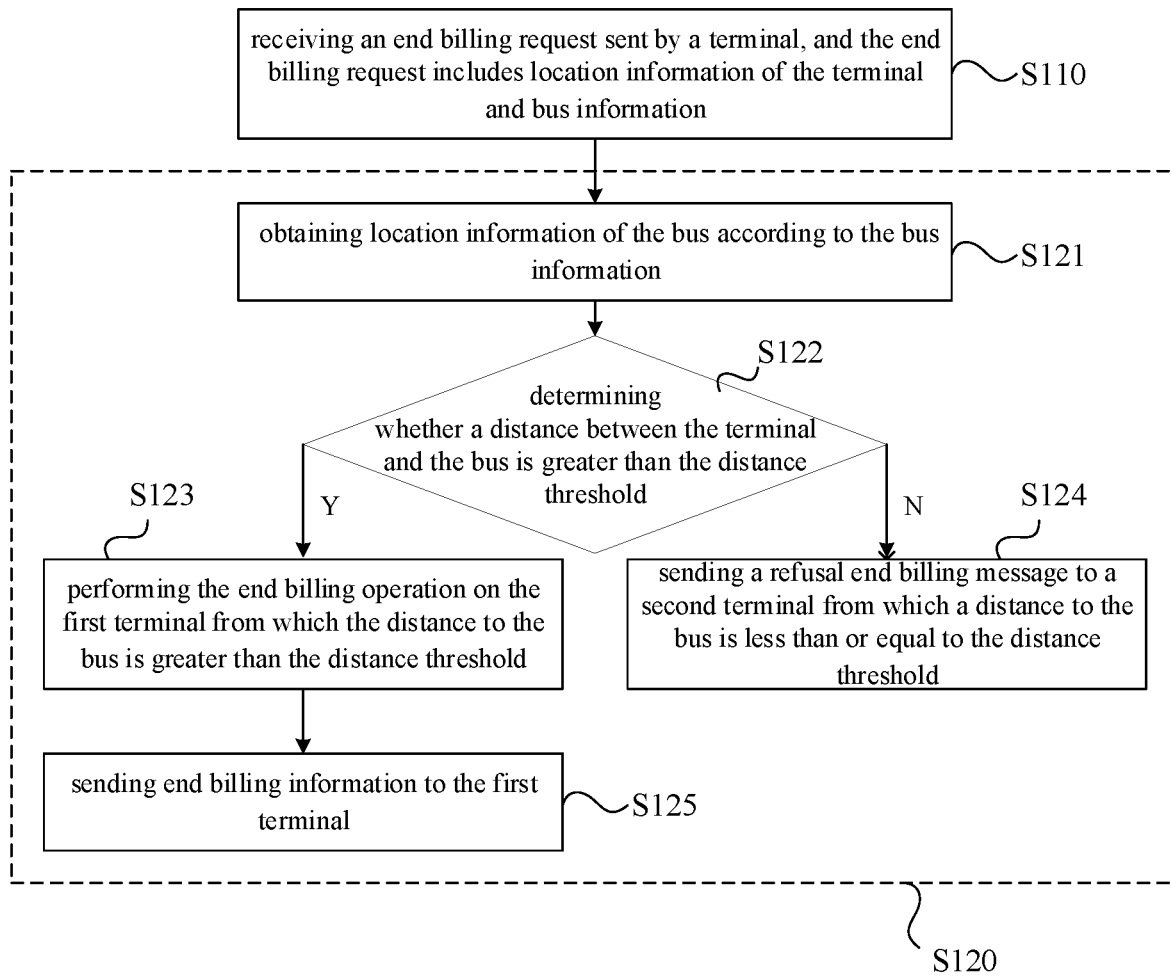
FIG. 2 is a flowchart of another method for generating billing information provided by an embodiment of the disclosure.

Optionally, FIG. 2 is a flowchart of another method for generating billing information provided by an embodiment of the disclosure. Based on the embodiment shown in FIG. 1, in the method for generating billing information provided by the embodiment of the present disclosure, an implementation of S120 may include the following steps:

in S121: location information of the bus is obtained according to the bus information;

in S122, it is determined whether a distance between the terminal and the bus is greater than the distance threshold according to the location information of the terminal and the location information of the bus; when the distance is greater than the distance threshold, S123 is executed;

in S123, the end billing operation is performed for the first terminal from which the distance to the bus is greater than the distance threshold.

In the above embodiments of the present disclosure, it has been explained that the end billing request received by the server includes the bus information, and the server may interact with the corresponding bus card machine based on the known bus information, that is, according to the bus information, the server may obtain the current location information of the bus related to bus travel for which the terminal requests to end the billing. The server may calculate the current distance between the terminal sending the request and the bus by combining the location information of the bus obtained in real time and the location information of the terminal in the request, and compare the calculated distance with the known distance threshold. If the calculated current distance is greater than the distance threshold, it is considered that the passenger using the terminal (that is, the first terminal) has got off the bus, and the end billing operation may be performed for the first terminal.

In a practical application, in a case where the server determines that the distance between the terminal and the bus is less than or equal to the distance threshold, it is considered that the passenger using the terminal (that is, the second terminal) does not get off the bus at present, and the end billing operation is not performed for the second terminal. At this time, the server may send a prompt message to the second terminal to indicate the distance between the passenger using the second terminal and the bus is too close at present, the billing cannot be forcibly ended temporarily, and the operation may be tried again later. In addition, for the first terminal on which the server has performed the end billing operation, the server may send the end billing information to the terminal, thereby instructing the first terminal to clear the bus information written by the terminal when swiping the card to get on the bus, and deduct the corresponding bus travel cost. As shown in FIG. 2, in the method for generating billing information provided by the embodiments of the present disclosure, when the determination result of S122 is that the distance between the terminal and the bus is less than or equal to the distance threshold, S124 is executed; in addition, after the S123 in the embodiment shown in FIG. 2, S125 is executed.

In S124, a refusal end billing message is sent the second terminal from which the distance to the bus is less than or equal to the distance threshold.

In S125, an end billing message is sent the first terminal.

In the embodiments of the present disclosure, billing result information sent by the server to the terminal includes information sent to terminals in two types of different situations. For the first terminal that meets the condition for ending the billing, the billing result information sent by the server to it is the end billing information, which may be returned to an APP in the first terminal. The APP may access the end billing information to the NFC bus card or an NFC module in the first terminal, and deduct the corresponding bus travel cost. At this time, the first terminal has completed a complete bus travel; for the first terminal that does not meet the condition for ending the billing, the billing result information sent by the server to it is the refusal end billing message, and the message is also returned to the APP in the terminal, and the passenger is reminded that the billing cannot be forcibly ended for the time being through the APP, and please try again later, that is, the passenger may send the end billing request again through the second terminal in the future. Therefore, after the S124 in the embodiment shown in FIG. 2, it is possible to return to perform S110. At this time, the terminal that sends the end billing request to the server may include the second terminal that receives the refusal end billing message in S124.

Figure 3:
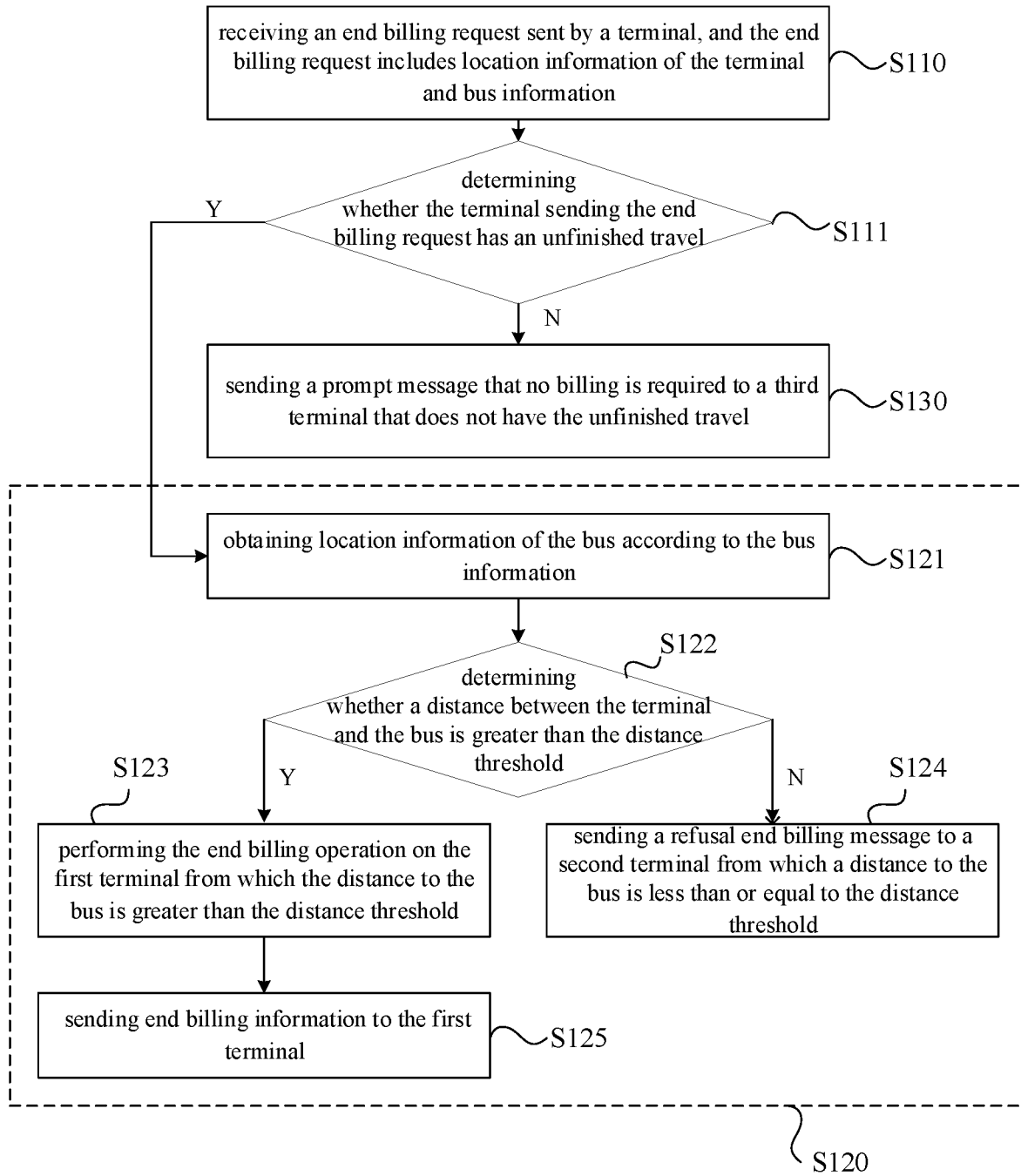
FIG. 3 is a flowchart of yet another method for generating billing information provided by an embodiment of the disclosure.

Optionally, FIG. 3 is a flowchart of yet another method for generating billing information provided by an embodiment of the present disclosure. On the basis of the foregoing embodiments, after S110, the method provided in this embodiment may further include:

in S111, it is determined whether the terminal sending the end billing request has an unfinished travel; when it is determined that the terminal has the unfinished travel, the server performs the subsequent determination according to the end billing request, and performs corresponding operations based on the determination result.

FIG. 3 shows an example based on the process shown in FIG. 2 above. When it is determined that the terminal sending the request has the unfinished travel, the passengers of these terminals are considered to have the prerequisite for getting off the bus and forgetting to swipe their card, that is, these passengers have performed the card swiping operation when getting on the bus, and have not performed the card swiping operation for getting off the bus. For these passengers with the unfinished travel, the server may continue to perform the operation of S120. When it is determined that the terminal sending the request does not have the unfinished travel, it is considered that the passengers of these terminals have already taken a complete bus travel, and there is currently no travel that may forcibly be ended billing. Therefore, when some terminals that send the request have the unfinished travel in the determination results in the S111 executed by the server, the server executes S120 on these terminals (that is, the first terminal and the second terminal in the above embodiments); when some terminals that send the request do not have the unfinished travel in the determination results in the S111 executed by the server, the server executes S126 on these terminals (for example, a third terminal).

In S130, a prompt message that no billing is required is sent to the third terminal that does not have the unfinished travel.

The method for generating billing information provided by the embodiments of the present disclosure uses the APP technology of the terminal, the NFC communication technology of the terminal (or the bus card) and the bus card machine, and the billing system of the server. In a case where the passenger takes the bus and forgets to swipe the card for getting off the bus after getting off the bus, the passenger may actively initiate a request to the server through the operation performed at the terminal side to request the server to end the billing of the current travel. After the server receives the end billing request of the terminal, it may determines whether the terminal meets the condition for ending the billing based on an obtained actual condition, for example, whether the terminal has a travel that needs to be billed, and whether the terminal has not been in the bus and has not yet performed the card swiping, so as to perform the end billing operation for the first terminal that meets the condition for ending the billing. The method for generating billing information provided by the embodiments of the present disclosure may be operated by the three entities of the terminal with the NFC function, the bus card machine, and the server in corporation. For a passenger who takes the bus and forgets to swipe the card when getting off the bus, the full-course travel fee is not deducted. Instead, according to a location where the passenger forces to end the billing, a cost of the corresponding station or the mileage is deducted. Compared with a billing method of deducting the full-course travel fee for the passenger who takes the bus and forgets to swipe the card when getting off the bus in the related art, the method for generating billing information provided by the embodiment of the present disclosure may greatly reduce the economic loss caused by the passenger getting off the bus and forgetting to swipe the card, and has a great market prospect.

Figure 4:
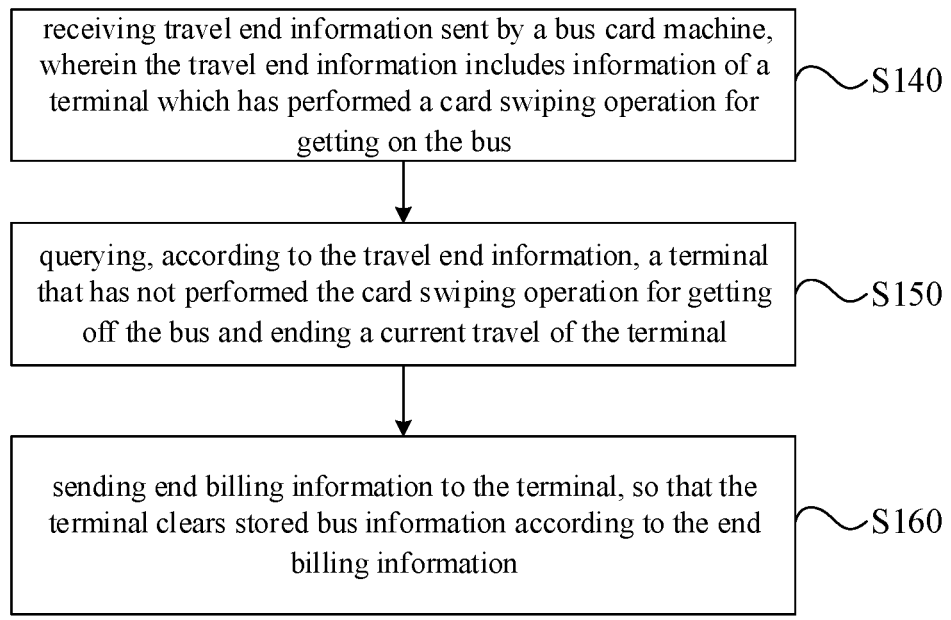
FIG. 4 is a flowchart of yet another method for generating billing information provided by an embodiment of the disclosure.

FIG. 4 is a flowchart of yet another method for generating billing information provided by an embodiment of the disclosure. The method for generating billing information provided in this embodiment is applicable to a case in which a passenger takes a bus and charge for the passenger's travel. The method for generating billing information may be executed by a server for billing a travel, and the server performs the bus travel billing through communication with a terminal that performs the card swiping operation used by the passenger. As shown in FIG. 4, the method for generating billing information provided by the embodiments of the present disclosure may include the following steps.

In S140, travel end information sent by the bus card machine is received, and the travel end information includes information of a terminal which has performed a card swiping operation for getting on the bus.

In the method for generating billing information provided in any of the above embodiments shown in FIGS. 1 to 3 of the present disclosure, the end billing request is actively sent to the server through the terminal in a case where the passenger who uses the terminal to swipe the card when getting on the bus finds that the card swiping operation for getting off the bus is not performed after getting off the bus, in order to end the current travel of the passenger by the method. In the application of using the terminal to perform the bus travel billing, there is also an application scenario in which the passenger has got off the car and has not performed the card swiping operation, and has not found that the card swiping operation for getting off the bus is not performed, or has not actively requested the server to end the billing for this travel by means of the terminal.

For the above application scenarios, when the bus arrives at the station, the information of the terminal used by the passenger is still stored on the bus card machine, and the terminal also always stores the information of the unfinished travel, including, such as, the bus information and information of performing the card swiping operation for getting on the bus. The bus billing method of the related art may detect that the terminal has the unfinished travel when the terminal performs the card swiping operation for getting on the bus next time, and deduct the full-course travel fee for the unfinished travel, which not only causes relatively large economic losses to the passenger, but also has always stored relevant information about the terminal's unfinished travel on the terminal, server and bus card machine, which is not conducive to the management of the internal storage information of the server, bus card machine and the terminal. In contrast, in the method for generating billing information provided by the embodiments of the present disclosure, after the bus arrives at the station, the bus card machine may send the travel end information to the server. After the passenger who uses the terminal to perform the card swiping operation for getting on/off the bus has performed the card swiping operations for getting on and off the bus once, the bus card machine may clear the information of the terminal, that is, after the bus arrives at the station, the information of the terminal that normally performs the card swiping operations for getting on and off the bus has been deleted, and for the terminal that performs the card swiping operation for getting on the bus, but does not perform the card swiping operation for getting off the bus, the information that the card swiping operation for getting on the bus has been performed is still recorded in the bus card machine. Therefore, the travel end information received by the server may include the information of the terminal that has performed the card swiping operation for getting on the bus.

In S150, the terminal that has not performed the card swiping operation for getting off the bus is found out according to the travel end information, and the current travel of the terminal is ended.

In the embodiments of the present disclosure, the server receives the travel end information sent by the bus card machine, and knows that the current travel of the corresponding bus has ended, and all passengers of the current travel also get off the bus. When the server reads the content of the travel end information, it may query that some passengers have got off the bus and did not use the terminal to perform the card swiping operation for getting off the bus. At this time, for the terminals that have not performed the card swiping operation queried by the server, the current travels of these terminals may be actively ended by the server.

Optionally, the method provided in the embodiments of the present disclosure may further include the following steps.

In S160, end billing information is sent to the terminal, so that the terminal clears the stored bus information according to the end billing information, and deducts the cost of the current travel.

In the embodiments of the present disclosure, after the server ends the current travel of the terminal that has not performed the card swiping operation for getting off the bus, it may send the end billing information to the terminal, so that the terminal deducts the cost of the current travel at its own end and clears the stored bus information. Since the travel end information received by the server in the embodiments of the present disclosure records the information of the terminal performing the card swiping operation for getting on the bus, the billing standard for the terminal may be: cost from the station where the card swiping operation for getting on the bus is performed to a corresponding station at the end of the travel or cost of mileage. In this way, compared with full-course travel billing, it may not only reduce the economic loss of the passenger to a certain extent, but also end the current travel without waiting for the next time the terminal performs the card swiping operation for getting on the bus, so that the server, bus card machine and terminal may delete the relevant information of the current travel after the travel ends, thereby avoiding the record of redundant information, which is conducive to the information management and optimization of the bus billing system.

According to the method for generating billing information provided by the embodiments of the present disclosure, by receiving the travel end information which includes the information of the terminal which has performed the card swiping operation for getting on the bus sent by the bus card machine, and according to the travel end information, the server queries the terminal that does not perform the card swiping operation for getting off the bus, and ends the current travel of the terminal. According to the method for generating billing information provided by the embodiments of the present disclosure, for the passenger who takes the bus and forget to swipe the card when getting off the bus, the cost is not deducted when the passenger uses the terminal to perform the card swiping operation for getting on the bus next time. Instead, the server actively determines which terminals have performed the card swiping operation for getting off the bus, actively ends the current travels of these terminals, and deducts the cost of the corresponding station or mileage according to the station where the passenger uses the terminal to swipe the card to get on the bus, which may not only reduce the economic loss of the passenger to a certain extent, but also end the current travel without waiting for the next time the terminal performs the card swiping operation for getting on the bus, thereby avoiding the record of redundant information, which is conducive to the information management and optimization of the bus billing system, and has a great market prospect.

Figure 5:
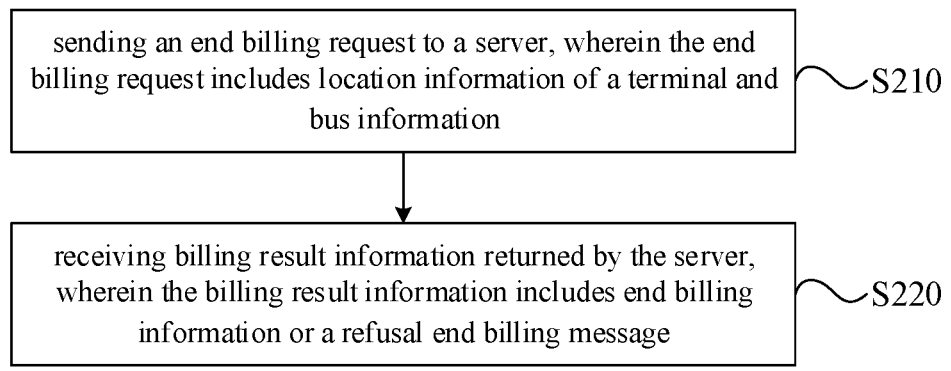
FIG. 5 is a flowchart of yet another method for generating billing information provided by an embodiment of the disclosure.

FIG. 5 is a flowchart of yet another method for generating billing information provided by an embodiment of the present disclosure. The method for generating billing information provided in this embodiment is applicable to a case where the passenger takes the bus and initiates the billing for the travel actively through the terminal. The method for generating billing information may be executed by the terminal used by the passenger. The terminal uses the NFC communication with the bus card machine and the communication with the server to complete the billing for current travel. As shown in FIG. 5, the method for generating billing information provided by the embodiments of the present disclosure may include the following steps.

In S210, the end billing request is sent to the server, and the end billing request includes the location information of the terminal and the bus information which is information in the current trip of the terminal.

The method for generating billing information provided by the embodiments of the present disclosure is a processing manner in which the terminal configured to perform the bus card swiping requests the server to perform travel billing for its current trip. Generally, when the passenger gets on and gets off the bus, the passenger may use the terminal for bus card swiping to perform the card swiping operation for getting on the bus or the card swiping operation for getting off the bus, and the card swiping operations for getting on/off the bus performed by the passenger may be reported to the server by the bus card machine. Therefore, the server may learn the condition of the passenger getting on/off bus based on the card swiping operation for getting on the bus and/or the card swiping operation for getting off the bus performed by the bus swiping terminal used by the passenger, in order to realize the billing for the travel. For example, if the terminal used by the passenger has performed the card swiping operation for getting on the bus, and does not perform the card swiping operation for getting off the bus, it is considered that the passenger is currently taking the bus where the passenger has swiped the card; for another example, the terminal used by the passenger has performed the card swiping operation for getting on the bus, and also performed the card swiping operation for getting off the same bus, it is considered that the passenger has completed the bus travel; for yet another example, in a case where the terminal used by the passenger has a record of the card swiping operation for getting on the bus during a previous bus travel while the card swiping operation for getting off the bus is not performed during the previous bus travel, and a current card swiping operation for getting on the bus during a current travel is performed, it is considered that the card swiping operation for getting off the bus during the previous bus travel is forgot to be performed. At this time, the previous bus travel is usually charged for a cost of a whole travel of the bus to end the previous travel, so as to record the current bus travel. In the above various application scenarios, for a case in which the passenger performs the card swiping operation for getting on the bus, but does not perform the card swiping operation for getting off the bus, the server will charge the previous travel for the cost of the whole travel of the bus when the passenger uses the terminal to perform the card swiping operation for getting on a bus next time, that is, initiating a new bus travel, which causes relatively large economic losses to the passenger.

Based on the above problems, the terminal configured to perform the bus card swiping in the embodiments of the present disclosure may perform the information interaction with the server. In a case where the passenger using the terminal find that he/she has got off the bus and has not swiped the card, the end billing request is actively sent to the server by the terminal through the operations performed on the terminal side. The operation performed on the terminal side by the passenger is, for example, clicking on an option of forcibly ending billing in the APP of the mobile phone. The end billing request may carry the current location information of the terminal and the bus information in the current unfinished travel of the terminal. The bus information is information written by the bus card machine to the terminal when the terminal initiates the current travel (a travel initiated when the last car swiping operation for getting on the bus is performed).

It should be noted that the terminal configured to perform bus card swiping in the embodiments of the present disclosure is, for example, a mobile phone with a NFC function, which realizes the card swiping operation by installing an APP in the mobile phone which performs swiping interactive operations with a bus card machine and the server, and also realizes the billing through the information interaction with the server. The APP in the mobile phone is enabled, and the mobile phone approaches the bus card machine to perform the card swiping operation for getting on/off the bus. A program that is configured to perform the card swiping operation for getting on/off the bus may also be a mini program in an existing APP in the mobile phone, for example, a travel code in WeChat or Alipay. In addition, the terminal configured to perform bus card swiping in the embodiments of the present disclosure may also be used in conjunction with an NFC bus card and a mobile phone. For example, if the mobile phone does not have the NFC function, the NFC bus card may be used to get on and off the bus and swipe the card. In the way of binding the NFC bus card in the mobile phone APP, the billing is realized by the information interaction between the mobile phone and the server.

In S220, billing result information returned by the server is received, and the billing result information includes the end billing information or the refusal end billing message. The end billing information is sent to the terminal after it is determined that a distance between the terminal and the bus is greater than the distance threshold according to the location information of the terminal and the bus information and the end billing operation is performed for the terminal by the server.

In the embodiments of the present disclosure, considering a false operation of the passenger using the terminal to send the end billing request, for example, some passengers use the terminal to click the option of forcibly ending the billing without getting off the bus. A way in which the server ends the billing is same as the above embodiments, that is, after receiving the end billing request, the server may first determine whether the terminal that sent the end billing request meets a condition for ending the billing. For example, it is determined whether the terminal that sent the request meets the condition for ending the billing based on a distance between the terminal and the bus.

It should be noted that, in the embodiment of the present disclosure, the implementation for the server to determine whether the terminal meets the condition for ending the billing has been described in detail in the above embodiments of the server-side, which will not be repeated in the embodiments of the terminal-side.

In the above embodiments, it has been explained that a terminal that complies with the billing condition determined by the server is defined as the first terminal, and a terminal that does not comply with the billing condition determined by the server is defined as the second terminal. Based on the determination result of the server, the terminal in the embodiments of the present disclosure may be defined as the first terminal or the second terminal. In the embodiments of the present disclosure, after the server performs the above determination, there are the following two cases. A first case is to determine that the terminal meets the condition for ending the billing, and the terminal is the first terminal mentioned above. In this case, the billing result information received by the terminal includes the end billing information. At this time, the APP in the terminal may clear the written bus information when the terminal performs the card swiping to get on the bus, and deduct the cost of the corresponding travel; the second case is to determine that the terminal does not meet the condition for ending the billing, and the terminal is the second terminal. In this case, the billing result information received by the terminal includes the refusal end billing message, and the message may also be returned to the APP in the terminal, and the passenger is reminded that the billing cannot be forcibly ended for the time being through the APP, and please try again later, that is, the passenger may send the end billing request again through the operation performed on the terminal in the future. That is, if the terminal receives the refusal end billing message sent by the server in S220, S210 and S220 may be repeated subsequently.

Based on a demand for the server to determine whether the terminal meets the condition for ending the billing, the end billing request sent by the terminal in the embodiments of the present disclosure may carry current location information of the terminal to provide the server with basic information for determination. In addition, when the terminal performs the card swiping operation for getting on the bus, the bus card machine may write the bus information into the terminal through the NFC communication with the terminal, and the end billing request sent by the terminal may also carry the stored bus information, the bus information includes, for example, a bus line name, a license plate number, and a number of the bus card machine, so that the server may learn the current location information of the bus based on the bus information, thereby determining whether the terminal meets the condition for ending the billing according to the location information of the bus and the location information of the terminal. For example, the distance between the terminal and the bus may be determined based on the location information of the terminal and the bus information. When the distance between the bus and the terminal is greater than a set distance threshold which may be set to not less than a length of the bus, and the passenger is considered to have got off the bus.

The distance threshold in the embodiments of the present disclosure may be distance information set in the server to determine whether the passenger has got off the bus. Due to different bus models, different distance thresholds may be set for different buses. The distance threshold may also be presented in the bus information in the end billing request sent by the terminal. For example, if the bus information has a bus model, the server may determine an appropriate distance threshold according to the bus model to determine whether the passenger has got off the bus.

In the method for generating billing information provided by the embodiments of the present disclosure, the terminal sends the end billing request including the location information of the terminal and the bus information to the server, and receives the billing result information returned by the server. The billing result information includes the end billing information or the refusal end billing message. The end billing information is sent to the terminal after it is determined that a distance between the terminal and the bus is greater than the distance threshold according to the location information of the terminal and the bus information and the end billing operation is performed for the terminal by the server. For a passenger who takes the bus and forgets to swipe the card when getting off the bus, the method for generating billing information provided by the embodiments of the present disclosure does not deduct the full-course travel fee. Instead, according to a location where the passenger forces to end the billing (that is, the location information of the terminal in the end billing request sent by the terminal), a cost of the corresponding station or the mileage is deducted. Compared with a billing method of deducting the full-course travel fee for the passenger who takes the bus and forgets to swipe the card when getting off the bus in the related art, the method for generating billing information provided by the embodiment of the present disclosure may greatly reduce the economic loss caused by the passenger getting off the bus and forgetting to swipe the card, and has a great market prospect.

Figure 6:
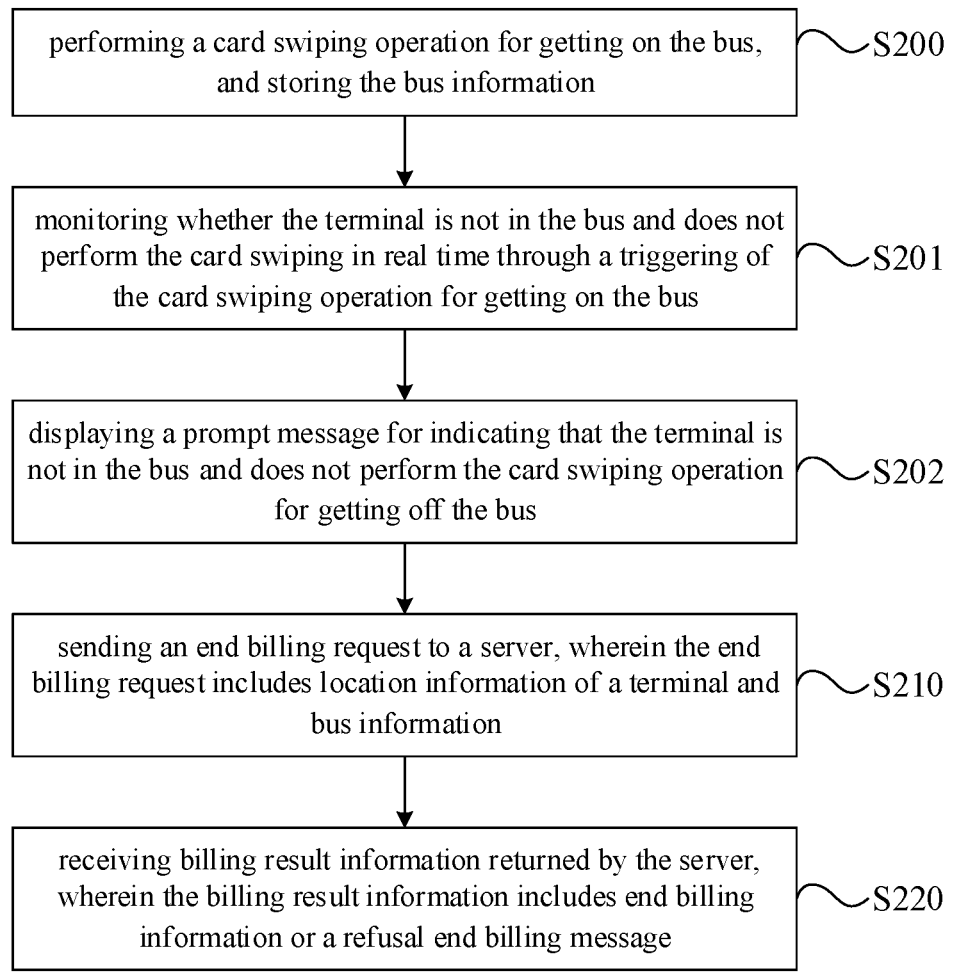
FIG. 6 is a flowchart of yet another method for generating billing information provided by an embodiment of the disclosure.

Optionally, FIG. 6 is a flowchart of another method for generating billing information provided by an embodiment of the present disclosure. Based on the embodiment shown in FIG. 5, before S210, the method for generating billing information provided by the embodiment of the present disclosure may further include:

in S200, the card swiping operation for getting on the bus is performed, and the bus information is stored; and in S201, it is monitored whether the terminal is not in the bus and does not perform the card swiping in real time through a triggering of the card swiping operation for getting on the bus.

In the embodiments of the present disclosure, the terminal may initiate the current travel only after performing the card swiping operation for getting on the bus on the bus card machine through its NFC function, i.e., having the prerequisite for forcibly ending the billing. When the NFC communication is performed between the bus card machine and the terminal, it may be known that what is performed by the terminal at this time is the card swiping operation for getting on the bus. At this time, the bus card machine writes the corresponding bus information into a memory of the terminal, and the bus information may be used by the server to subsequently perform the travel billing for the terminal, and may also be used by the server to determine whether the terminal meets the condition for ending the billing by combining the bus information when receiving the end billing information. The terminal may initiate the monitoring operation for monitoring whether it is off the bus and does not perform the card swiping in real time through the triggering of the terminal performing the card swiping operation for getting on the bus. The monitoring operation may be performed through a preset program. The monitoring method is for example: the triggering of the terminal performing the card swiping operation for getting on the bus starts the monitoring, which may be a thread that starts the monitoring program, and after the program is started, a sleep state is entered. The sleep time may be set by the designer or according to the user requirements. After the sleep time elapses, it wakes up and monitors whether the terminal is off the bus without performing the card swiping. The sleep time may be a set period of time, for example, wake up the monitoring every 1 minute (min) of sleep, and continue to enter the sleep time after this monitoring is completed.

In the method for generating billing information provided by the embodiments of the present disclosure, the terminal may monitor its own card swiping operations for getting on/off the bus in real time, that is, the passenger may actively learn whether the card swiping operation for getting off the bus has been performed. If the passenger has not got off the bus, then the monitored result of not performing the card swiping operation for getting off the bus may be ignored. If the passenger has got off the bus and it is found that the terminal monitors a result of not performing the card swiping operation for getting off the bus, the end billing request may be actively initiated, that is, S210~S220 in the above embodiments may be actively performed according to the monitoring result.

Optionally, in the embodiments of the present disclosure, the implementation of monitoring whether the terminal is not in the bus and does not perform the card swiping in real time may include the following steps:

in step 1, the stored bus information is read in real time;

in step 2, when the bus information is read, the location information of the terminal is obtained, and the location information of the bus is obtained from the server; and in step 3, when the distance between the terminal and the bus is greater than the distance threshold, it is determined that the terminal is not in the bus and does not perform the card swiping.

It should be noted that in the embodiments of the present disclosure, the whether the terminal is not in the bus and does not perform the card swiping indicates that it is monitored that the passenger using the terminal has got off the bus and has not performed the card swiping operation for getting off the bus. In this case, the terminal may actively remind the passenger that the card swiping operation for getting off the bus is not performed, so that the passenger may learn about the current travel condition, and actively initiate the end billing request to the server through the operation on the terminal. That is to say, in the embodiments of the present disclosure, the implementation of S210 may be: after it is monitored that the terminal is not in the bus and does not perform the card swiping, the end billing request is sent to the server.

In the embodiments of the present disclosure, after determining that the terminal is not in the bus and does not perform the card swiping in S201, the method may further include:

in S202, a prompt message for indicating that the terminal is not in the bus and does not perform the card swiping is displayed. Subsequently, S210 to S220 may be executed according to the prompt message.

Figure 7:
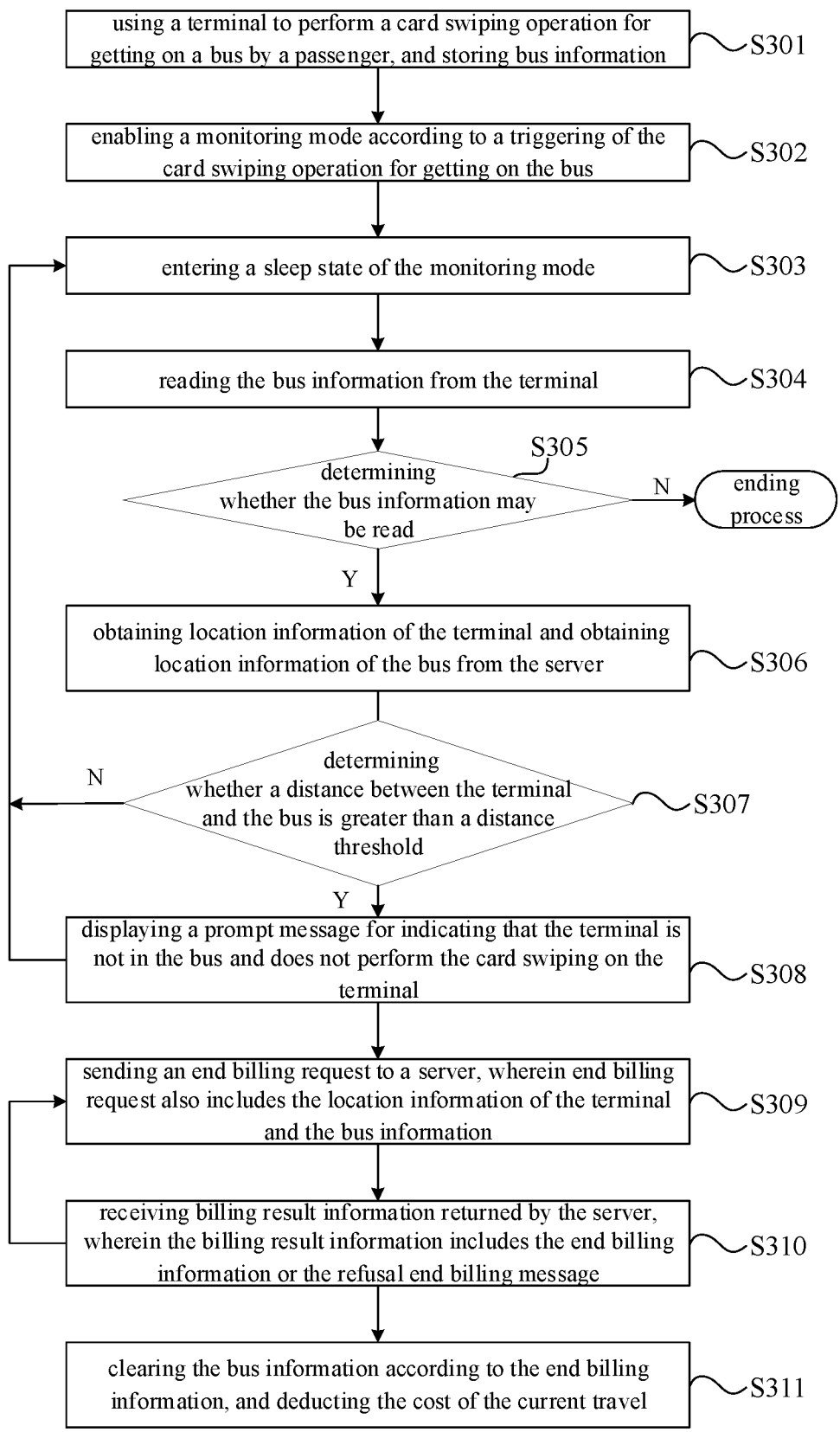
FIG. 7 is a flowchart of yet another method for generating billing information provided by an embodiment of the disclosure.

Optionally, FIG. 7 is a flowchart of yet another method for generating billing information provided by an embodiment of the present disclosure. In the foregoing embodiments of the present disclosure, the method for generating billing information provided by the embodiment shown in FIG. 7 may include the following steps:

in S301, the passenger uses the terminal to perform the card swiping operation for getting on the bus, and the bus information is stored;

in S302, a monitoring mode is enabled according to a trigger of the card swiping operation for getting on the bus;

in S303, a sleep state of the monitoring mode is entered, and the sleep state is for example, sleep for 1 minute;

in S304, the bus information is read from the terminal;

in S305, it is determined whether the bus information may be read; when valid bus information is read, S306 is executed; when the bus information is not read, it indicates that the terminal has no unfinished travel, that is, it indicates that the passenger using the terminal has performed the card swiping operation for getting off the bus, the process ends;

in S306, the location information of the terminal is obtained, and the location information of the bus is obtained from the server;

in S307, it is determined whether the distance between the terminal and the bus is greater than the distance threshold; when the determination result is that the distance between the two is greater than the distance threshold, S308 is executed; when the determination result is that the distance between the two is less than or equal to the distance threshold, return to execute S303, that is, the monitoring mode is continued to be performed;

in S308, the prompt message is displayed on the terminal, and the prompt message is used for indicating that the terminal is off the bus and does not perform the card swiping, that is, for prompting the passenger that the terminal currently has the unfinished travel, and indicating the passenger to actively initiate the end billing operation;

in the embodiments of the present disclosure, after the prompt message is displayed on the terminal, the passenger may use the terminal to perform the following steps S309 to S310, or may ignore the prompt message, resulting in excessive billing for travel, that is, after S308, it is also possible to return to execute S303;

in S309, the end billing request is sent to the server, and the end billing request also includes the location information of the terminal and the bus information;

in S310, billing result information returned by the server is received, and the billing result information includes the end billing information or the refusal end billing message;

in S311, the bus information is cleared according to the end billing information, and the cost of the current travel is deducted;

In S310 of the embodiments of the present disclosure, the terminal may receive the refusal end billing message, S309 may be continued after S310; in addition, before the terminal clears the bus information, the terminal may execute S308 and then repeat S303 until the terminal clears the bus information. At this time, the valid bus information cannot be read when S304 is executed, and the process ends after the determination in S305.

Figure 8:
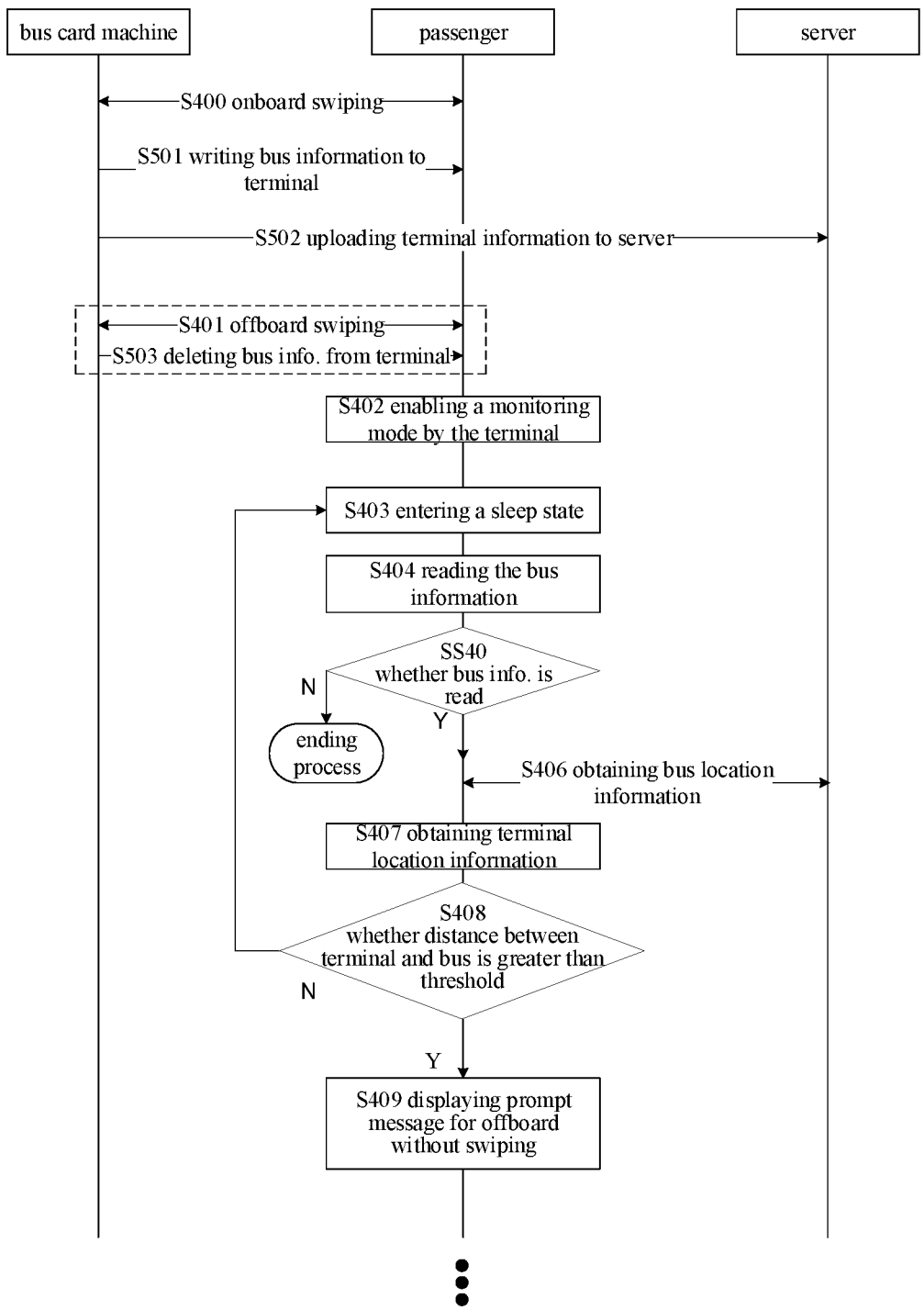
FIG. 8 is an interaction flowchart of a method for generating billing information provided by an embodiment of the disclosure.
Figure 8:
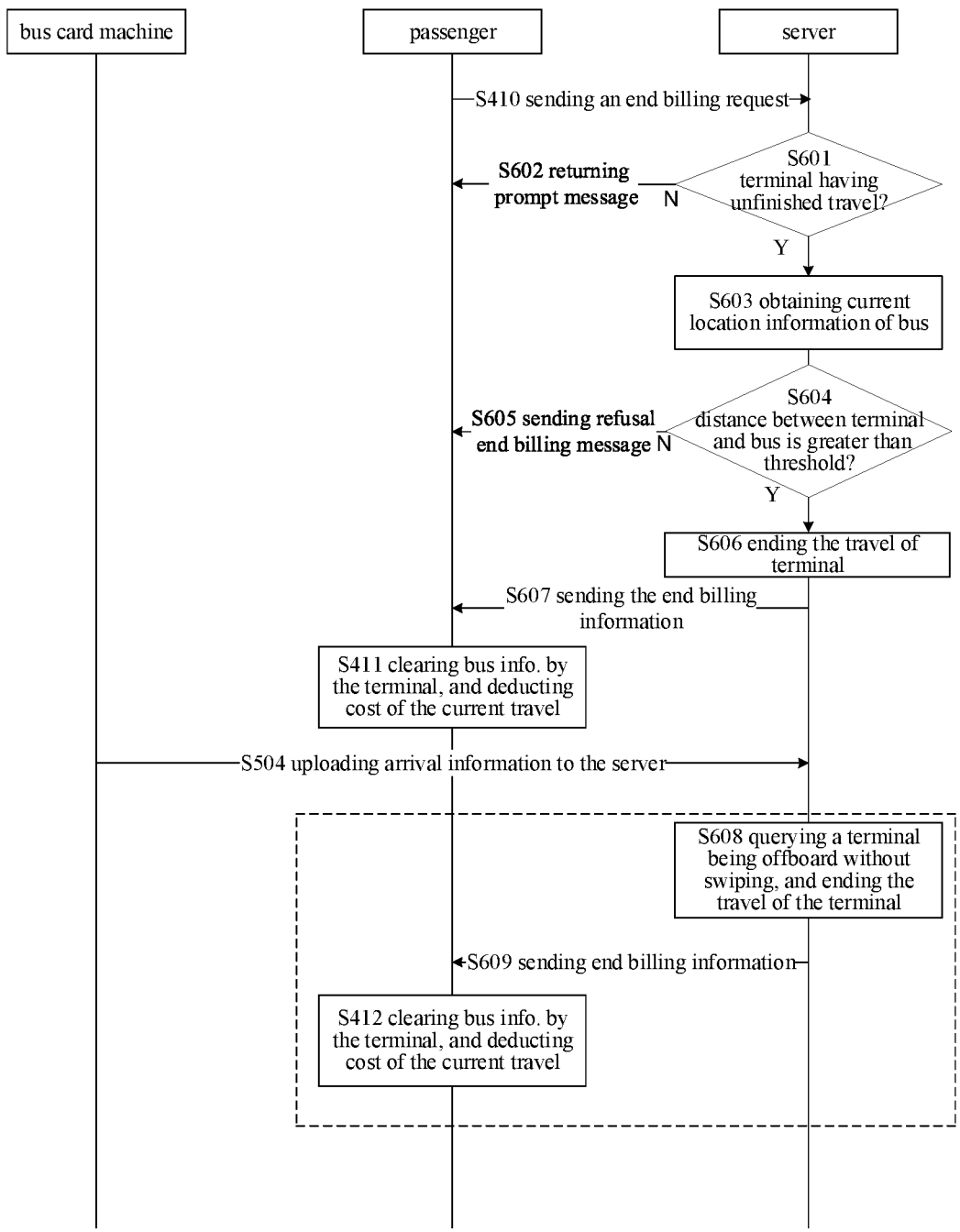

The following describes an actual application of the method for generating billing information provided by the embodiments of the present disclosure through the interaction mode of the terminal, the bus card machine, and the server. As shown in FIG. 8, which is an interaction flowchart of a method for generating billing information provided by an embodiment of the present disclosure. The method for generating billing information provided by the embodiments shown in FIG. 8 is executed by the terminal with the NFC function, the bus card machine, and the server. In FIG. 8, two terminals, that is, terminal A and terminal B, are shown, and the method for generating billing information may include the following steps:

in S400, the passenger enables the APP in the terminal and performs the card swiping operation for getting on the bus, that is, the above card swiping operation for getting on the bus is performed through the NFC communication between the terminal and the bus card machine;

in S402, the terminal enables the monitoring mode;

in S403, a sleep state of the monitoring mode is entered, and the sleep state is for example, sleep for 1 minute;

in S404, the bus information is read from the terminal;

in S405, it is determined whether the bus information may be read; when valid bus information is read, S406 is executed; when the bus information is not read, it indicates that the passenger using the terminal has performed the card swiping operation for getting off the bus, the process ends;

in S406, the location information of the bus is obtained from the server;

in S407, the current location information of the terminal is obtained, and in S408, it is determined whether the distance between the terminal and the bus is greater than the distance threshold; when the distance is greater than the distance threshold, S409 is executed; when the distance is less than or equal to the distance threshold, return to execute S403, that is, the monitoring mode is continued to be performed; and in S409, a prompt message that the terminal is off the bus and does not perform the card swiping operation is displayed on the terminal; then return to execute S403, and after the bus information is not read in the determination in S405, the process ends.

On the bus card machine side, the bus card machine communicates with the terminal through NFC. After recording the card swiping operation for getting on the bus of the terminal, the bus card machine performs the following steps.

In S501, the bus card machine writes the bus information into the terminal;

In S502, the bus card machine uploads the information of the terminal to the server.

Optionally, if the terminal in the embodiments of the present disclosure actively performs the card swiping operation for getting off the bus through NFC communication, that is, the terminal executes S401 to execute the card swiping operation for getting off the bus, and the bus card machine performs the following steps.

In S503, the bus card machine deletes the bus information in the terminal, and ends the process.

It should be noted that in the embodiments of the present disclosure, S401 and S503 are optionally performed. If the terminal does not actively perform the card swiping operation for getting off the bus, S401 and S503 are not executed, but the steps after S402 are executed.

In the embodiments of the present disclosure, after the passenger using the terminal finds the prompt message displayed on the terminal, the following steps may be continued to be performed.

In S410, the passenger clicks on the APP in the terminal to forcibly end the billing operation, so that the terminal sends the end billing request to the server, and the end billing request includes the location information of the terminal and the bus information.

In the embodiments of the present disclosure, after the server receives the end billing request sent by the terminal, the following steps are executed.

In S601, the server determines whether the terminal has the unfinished travel; when it is determined that there is no unfinished travel, it indicates that the terminal has performed the card swiping operation for getting off the bus, then S602 is executed; when it is determined that there is the unfinished travel, S603 is executed.

In S602, the server returns the prompt message to the APP in the terminal, which is used for prompting the passenger that there is no unfinished travel at present.

In S603, the server obtains the current location information of the bus.

In S604, the server determines whether the distance between the terminal and the bus is greater than the distance threshold; when it is less than or equal to the distance threshold, S605 is executed; when it is greater than the distance threshold, S606 is executed.

In S605, the server sends the refusal end billing message to the terminal, which is used for prompting the passenger that the used terminal cannot end the billing temporarily, and try again later.

In S606, the server ends the travel in the terminal.

In S607, the server sends the end billing information to the terminal.

After the terminal receives the ending billing information, it performs the following operations.

In S411, the terminal clears the bus information and deducts the cost of the current travel.

In the embodiments of the present disclosure, after the bus arrives at the stop, the bus card machine may also perform the following steps.

In S504, the bus card machine uploads arrival information to the server.

Correspondingly, the operations performed by the server include.

In S608, the server queries the information of the terminal that has not performed the card swiping operation for getting off the bus, and ends the travel of the terminal.

In S609, the server sends the end billing information to the terminal that ends the billing in S608.

Correspondingly, the terminal that receives the end billing information may also execute the following step:

in S412, the terminal clears the bus information and deducts the cost of the travel. In this case, the deducted fee is different from the fee for a case in which the end billing request is actively sent in S411, such as deducting the full-course travel fee, or deducting the fee from the stop where the card is swiped for getting on the bus. It should be noted that S608 to S609 and S412 in the process shown in FIG. 8 are optionally executed, and the above steps are executed only when the bus arrives at the stop and the terminal does not bill the current trip.

In the method for generating billing information provided by the embodiments of the present disclosure, the terminal used by the passenger may actively initiate the end billing request, and the terminal may monitor in real time whether the passenger has got off the bus and has not swiped the card according to the trigger of the card swiping operation for getting on the bus. When it is monitored a case in which the passenger has got off the bus and has not swiped the card, the passenger is actively reminded that the passenger currently has a travel to be completed, so that the passenger using the terminal actively initiates the end billing request to end the current travel and deduct the corresponding fee. Compared with the existing billing method of getting off the bus without swiping the card, it may greatly reduce the economic loss caused by the passenger forgetting to swipe the card when getting off the bus, and has a large market prospect.

Based on the method for generating billing information provided by any one of the embodiments shown in FIGS. 1 to 4 and FIG. 8 of the present disclosure, the embodiments of the present disclosure also provides a server, which is a hardware structure of the method for generating billing information provided in any of the embodiments shown in FIGS. 1 to 4, and is also the server in the method for generating billing information shown in FIG. 8.

The server provided by the embodiments of the present disclosure may include a memory and a processor;
the memory is configured to store executable instructions;
the processor is configured to implement the method for generating billing information in any of the embodiments shown in FIGS. 1 to 3 and FIG. 8 when executing the executable instructions stored in the memory,
the processor is also configured to implement the method for generating billing information in any of the embodiments shown in FIG. 4 and FIG. 8 when executing the executable instructions stored in the memory.

Figure 9:
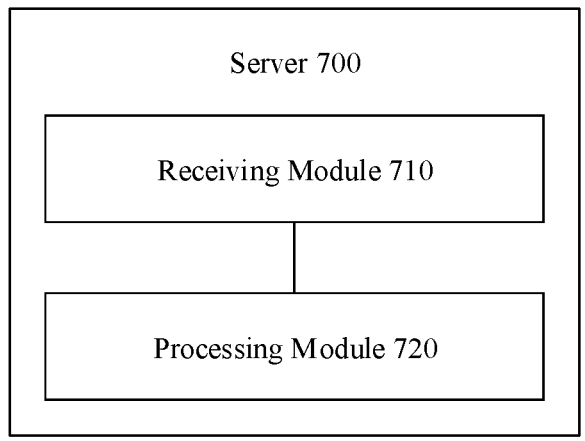
FIG. 9 is a schematic structural diagram of a server provided by an embodiment of the disclosure.

As shown in FIG. 9, which is a schematic structural diagram of a server provided by an embodiment of the present disclosure. A server 700 provided by the embodiments of the present disclosure is applicable to a case in which a passenger takes a bus and charge for the passenger's travel, and the server 700 charges the travel through the communication with the terminal that performs the card swiping operation used by the passenger. The server 700 may include: a receiving module 710 and a processing module 720;

The receiving module 710 is configured to receive an end billing request sent by a terminal, wherein the end billing request includes location information of the terminal and bus information.

The server provided by the embodiments of the present disclosure is configured to charge the passenger for taking the bus according to the getting on and off status of the passenger during the bus billing process. A way for the server getting aware of the condition of getting on and off the bus at the passenger side may be based on a card swiping operation for getting on the bus and/or a card swiping operation for getting off the bus performed by a bus swiping terminal used by the passenger. In the existing billing method of the server, for a case in which the passenger performs the card swiping operation for getting on the bus, but does not perform the card swiping operation for getting off the bus, the server will charge the previous travel for the cost of the whole travel of the bus when the passenger uses the terminal to perform the card swiping operation for getting on a bus next time, that is, initiating a new bus travel, which causes relatively large economic losses to the passenger.

It should be noted that the terminal configured to perform bus card swiping in the embodiments of the present disclosure is, for example, a mobile phone with an NFC function. In addition, the terminal configured to perform bus card swiping in the embodiments of the present disclosure may also be used in conjunction with an NFC bus card and a mobile phone. For example, if the mobile phone does not have the NFC function, the NFC bus card may be used to get on and off the bus and swipe the card. In the way of binding the NFC bus card in the mobile phone APP, the billing is realized by the information interaction between the mobile phone and the server.

In the embodiments of the present disclosure, the terminal configured to perform the bus card swiping may perform the information interaction with the server, and a receiving module 710 of the server 700 may receive the end billing request actively sent by the terminal. The end billing request may be an end billing request sent to the server through an operation performed on the terminal side in a case where the passenger finds that he/she does not perform the card swiping when he/she has got off the bus. The operation performed on the terminal side by the passenger is, for example, clicking on an option of forcibly ending billing in the APP of the mobile phone.

The processing module 720 is configured to perform the end billing operation for the first terminal from which the distance to the bus is greater than the distance threshold according to the location information of the terminal and the bus information In the embodiments of the present disclosure, considering a false operation of the passenger using the terminal to send the end billing request, for example, some passengers use the terminal to click the option of forcibly ending the billing without getting off the bus. A way to end the billing may be set as follows: after the receiving module 710 of the server 700 receives the end billing request, the processing module 720 may first determine whether the terminal that sent the request meets a condition for ending the billing. For example, it is determined whether the terminal that sent the request meets the condition for ending the billing based on a distance between the terminal and the bus.

Based on a demand for the processing module 720 of the server 700 to determine whether the terminal meets the condition for ending the billing, the end billing request sent by the terminal in the embodiments of the present disclosure may carry current location information of the terminal to provide the server with basic information for determination. In addition, when the terminal performs the card swiping operation for getting on the bus, the bus card machine may write the bus information into the terminal through the NFC communication with the terminal, and the end billing request sent by the terminal may also carry the stored bus information, the bus information includes, for example, a bus line name, a license plate number, and a number of the bus card machine. Since the bus moves in real time, the server may learn the current location information of the bus based on the bus information, so that the processing module 720 determines whether the terminal meets the condition for ending the billing according to the location information of the bus and the location information of the terminal. For example, the processing module 720 may determine the distance between the terminal and the bus based on the location information of the terminal and the bus information. When the distance between the bus and the terminal is greater than a set distance threshold which may be set to not less than a length of the bus, and the passenger is considered to have got off the bus.

The distance threshold in the embodiments of the present disclosure may be distance information set in the server to determine whether the passenger has got off the bus. Due to different bus models, different distance thresholds may be set for different buses. The distance threshold may also be presented in the bus information in the end billing request sent by the terminal. For example, if the bus information has a bus model, the processing module 720 may determine an appropriate distance threshold according to the bus model to determine whether the passenger has got off the bus.

It should be noted that in the embodiments of the present disclosure, there may be multiple terminals that send end billing requests to the server. Some of these terminals meet the condition for ending the billing, while some do not. Each embodiment of the present disclosure will define a terminal that meets the condition for ending the billing determined by the server as a first terminal, and the first terminal is a terminal that sends the end billing request to the server and the distance between it and the bus is greater than the distance threshold. In addition, the receiving module 710 in the server 700 in the embodiments of the present disclosure is, for example, a receiver, and the processing module 720 is, for example, a processor.

The server 700 provided in the disclosed embodiments is configured to execute the method for generating billing information provided in the embodiment shown in FIG. 1 of the present disclosure, and has corresponding functional modules. The implementation principles and technical effects are similar, and will not be repeated here.

Figure 10:
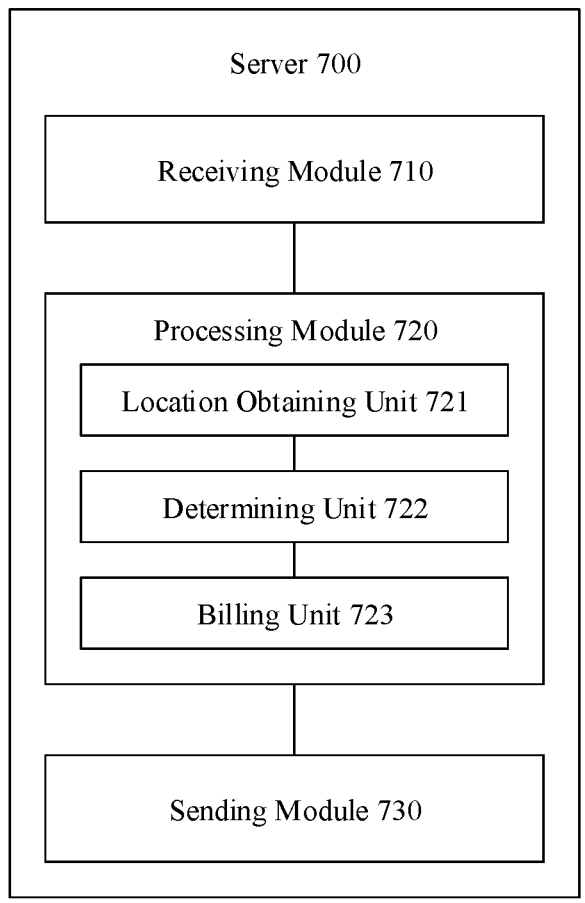
FIG. 10 is a schematic structural diagram of another server provided by an embodiment of the disclosure.

Optionally, FIG. 10 is a schematic structural diagram of another server provided by an embodiment of the present disclosure. Based on the structure of the server 700 shown in FIG. 9, in the server 700 provided in the embodiment of the present disclosure, the processing module 720 may include:
- a location obtaining unit 721, configured to obtain location information of the bus according to bus information;
- a determining unit 722, configured to determine whether a distance between the terminal and the bus is greater than the distance threshold according to the location information of the terminal and the location information of the bus; and
- a billing unit 723, configured to perform the end billing operation for the first terminal from which the distance to the bus is greater than the distance threshold.

Optionally, the server 700 provided in the embodiment of the present disclosure may further include:
- a sending module 730, configured to send billing result information to the terminal, and the billing result information includes end billing information sent to the first terminal and a refusal end billing message sent to a second terminal. The sending module 730 in the embodiment of the present disclosure may be a transmitter.

The server 700 provided in the disclosed embodiments is configured to execute the method for generating billing information provided in the embodiment shown in FIG. 2 of the present disclosure, and has corresponding functional modules. The implementation principles and technical effects are similar, and will not be repeated here.

Optionally, in the server 700 provided by the embodiments of the present disclosure, the determining unit 722 in the processing module 720 is further configured to determine whether the terminal sending the end billing request has the unfinished travel;

Correspondingly, an implementation for the billing unit 723 to perform the end billing operation for the first terminal may include:

The billing unit 723 is configured to perform the end billing operation for the first terminal having the unfinished travel and from which the distance to the bus is greater than the distance threshold.

The sending module 730 in the embodiments of the present disclosure is also configured to send a prompt message that no billing is required to a third terminal that does not have the unfinished travel.

The server 700 provided in the disclosed embodiments is configured to execute the method for generating billing information provided in the embodiment shown in FIG. 3 of the present disclosure, and has corresponding functional modules. The implementation principles and technical effects are similar, and will not be repeated here.

It should be noted that the billing method executed by the server in any of the embodiments shown in FIG. 9 to FIG. 10 of the present disclosure is that the end billing request is actively sent to the server through the terminal in a case where the passenger who uses the terminal to swipe the card when getting on the bus finds that the card swiping operation for getting off the bus is not performed after getting off the bus, in order to end the current travel of the passenger by the method. In the application of using the terminal to perform the bus travel billing, there is also an application scenario in which the passenger has got off the car and has not performed the card swiping operation, and has not found that the card swiping operation for getting off the bus is not performed, or has not actively requested the server to end the billing for this travel by means of the terminal.

For the above application scenarios, when the bus arrives at the station, the information of the terminal used by the passenger is still stored on the bus card machine, and the terminal also always stores the information of the unfinished travel, including, such as, the bus information and information of performing the card swiping operation for getting on the bus. The bus billing method of the related art may detect that the terminal has the unfinished travel when the terminal performs the card swiping operation for getting on the bus next time, and deduct the full-course travel fee for the unfinished travel, which not only causes relatively large economic losses to the passenger, but also has always stored relevant information about the terminal's unfinished travel on the terminal, server and bus card machine, which is not conducive to the management of the internal storage information of the server, bus card machine and the terminal. In contrast, in the method for generating billing information provided by the embodiments of the present disclosure, after the bus arrives at the station, the bus card machine may send the travel end information to the server. After the passenger who uses the terminal to perform the card swiping operation for getting on/off the bus has performed the card swiping operations for getting on and off the bus once, the bus card machine may clear the information of the terminal, that is, after the bus arrives at the station, the information of the terminal that normally performs the card swiping operations for getting on and off the bus has been deleted, and for the terminal that performs the card swiping operation for getting on the bus, but does not perform the card swiping operation for getting off the bus, the information that the card swiping operation for getting on the bus has been performed is still recorded in the bus card machine. Therefore, the travel end information received by the server may include the information of the terminal that has performed the card swiping operation for getting on the bus.

In an implementation of the embodiments of the present disclosure, each module in the server 700 is further configured with the following functions.

The receiving module 710 is also configured to receive travel end information sent by the bus card machine, and the travel end information includes information of a terminal which has performed a card swiping operation for getting on the bus;

The processing module 720 is also configured to query a terminal that has not performed the card swiping operation for getting off the bus according to the travel end information, and end a current travel of the terminal.

Optionally, in the server 700 provided in the embodiments of the present disclosure, the sending module 730 is also configured to send end billing information to the terminal that has not performed the card swiping operation for getting off the bus, so that the terminal clears the stored bus information according to the end billing information, and deducts cost for the current travel.

The server 700 provided in the disclosed embodiment is configured to execute the method for generating billing information provided in the embodiment shown in FIG. 4 of the present disclosure, and has corresponding functional modules. The implementation principles and technical effects are similar, and will not be repeated here.

Based on the method for generating billing information provided by any of the embodiments shown in FIGS. 5 to 7 and FIG. 8 of the present disclosure, the embodiments of the present disclosure also provide a terminal, which is a hardware structure of the method for generating billing information provided in any of the embodiments shown in FIGS. 5 to 7, and is also the terminal in the method for generating billing information shown in FIG. 8.

The terminal provided by the embodiments of the present disclosure may include a memory and a processor;

The memory is configured to store executable instructions;

The processor is configured to implement the method for generating billing information in any of the embodiments shown in FIGS. 5 to 7 and FIG. 8 when executing executable instructions stored in the memory.

Figure 11:
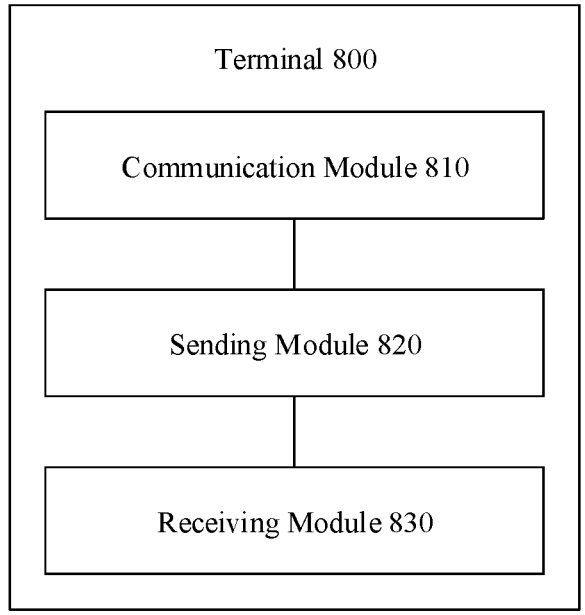
FIG. 11 is a schematic structural diagram of a terminal provided by an embodiment of the disclosure.

As shown in FIG. 11, which is a schematic structural diagram of a terminal provided by an embodiment of the present disclosure. The terminal 800 provided by the embodiment of the present disclosure is applicable to a case where the passenger takes the bus and initiates the billing for the travel actively through the terminal. The terminal 800 uses the NFC communication with the bus card machine and the communication with the server to complete the billing for current travel. The terminal 800 may include: a communication module 810, a sending module 820, and a receiving module 830.

The communication module 810 is configured to perform the card swiping operation for getting on the bus or the card swiping operation for getting off the bus through the communication with the bus card machine.

The sending module 820 is configured to send the end billing request to the server, and the end billing request includes the location information of the terminal and the bus information, and the bus information is information in the current travel of the terminal.

The terminal 800 provided in the embodiments of the present disclosure is configured to request the server to perform travel billing for its current trip. Generally, when the passenger gets on and gets off the bus, the passenger may use the terminal for bus card swiping to perform the card swiping operation for getting on the bus or the card swiping operation for getting off the bus, and the card swiping operations for getting on/off the bus performed by the passenger may be reported to the server by the bus card machine. Therefore, the server may learn the condition of the passenger getting on/off bus based on the card swiping operation for getting on the bus and/or the card swiping operation for getting off the bus performed by the bus swiping terminal used by the passenger, in order to realize the billing for the travel. A way for the server getting aware of the condition of getting on and off the bus at the passenger side may be based on a card swiping operation for getting on the bus and/or a card swiping operation for getting off the bus performed by a bus swiping terminal used by the passenger. In the existing billing method of the server, for a case in which the passenger performs the card swiping operation for getting on the bus, but does not perform the card swiping operation for getting off the bus, the server will charge the previous travel for the cost of the whole travel of the bus when the passenger uses the terminal to perform the card swiping operation for getting on a bus next time, that is, initiating a new bus travel, which causes relatively large economic losses to the passenger.

Based on the above problems, the terminal 800 configured to perform the bus card swiping in the embodiments of the present disclosure may perform the NFC communication with the bus card machine through the communication module 810, and its sending module 820 and receiving module 830 may perform the information interaction with the server. In a case where the passenger using the terminal find that he/she has got off the bus and has not swiped the card, the end billing request is actively sent to the server by the sending module 820 of the terminal 800 through the operations performed on the terminal side. The operation performed on the terminal side by the passenger is, for example, clicking on an option of forcibly ending billing in the APP of the mobile phone. The end billing request sent by the sending module 820 may carry the current location information of the terminal and the bus information in the current unfinished travel of the terminal. The bus information is information written by the bus card machine to the terminal when the terminal initiates the current travel (a travel initiated when the last car swiping operation for getting on the bus is performed).

It should be noted that the terminal configured to perform bus card swiping in the embodiments of the present disclosure is, for example, a mobile phone with an NFC function. In addition, the terminal configured to perform bus card swiping in the embodiments of the present disclosure may also be used in conjunction with an NFC bus card and a mobile phone. For example, if the mobile phone does not have the NFC function, the NFC bus card may be used to get on and off the bus and swipe the card. In the way of binding the NFC bus card in the mobile phone APP, the billing is realized by the information interaction between the mobile phone and the server. The communication module 810 in the terminal 800 is, for example, an NFC communication device.

The receiving module 830 is configured to receive billing result information returned by the server, and the billing result information includes the end billing information or the refusal end billing message. The end billing information is sent to the terminal after it is determined that a distance between the terminal and the bus is greater than the distance threshold according to the location information of the terminal and the bus information and the end billing operation is performed for the terminal by the server.

In the embodiments of the present disclosure, considering a false operation of the passenger using the terminal 800 to send the end billing request, for example, some passengers use the terminal to click the option of forcibly ending the billing without getting off the bus. A way to end the billing may be set as follows: after receiving the end billing request, the server may first determine whether the terminal that sent the request meets a condition for ending the billing. For example, it is determined whether the terminal that sent the request meets the condition for ending the billing based on a distance between the terminal and the bus.

It should be noted that, in the embodiment of the present disclosure, the implementation for the server to determine whether the terminal meets the condition for ending the billing has been described in detail in the above embodiments of the server-side, which will not be repeated in the embodiments of the terminal-side. In addition, in the embodiments of the present disclosure, the sending module 820 in 800 is, for example, a transmitter, and the receiving module 830 is, for example, a receiver.

In the above embodiments, it has been explained that a terminal that complies with the billing condition determined by the server is defined as the first terminal, and a terminal that does not comply with the billing condition determined by the server is defined as the second terminal. Based on the determination result of the server, the terminal in the embodiments of the present disclosure may be defined as the first terminal or the second terminal. In the embodiments of the present disclosure, after the server performs the above determination, there are the following two cases. A first case is to determine that the terminal meets the condition for ending the billing, and the terminal is the first terminal mentioned above. In this case, the billing result information received by the terminal includes the end billing information. At this time, the APP in the terminal may clear the written bus information when the terminal performs the card swiping to get on the bus, and deduct the cost of the corresponding travel; the second case is to determine that the terminal does not meet the condition for ending the billing, and the terminal is the second terminal. In this case, the billing result information received by the terminal includes the refusal end billing message, and the message may also be returned to the APP in the terminal, and the passenger is reminded that the billing cannot be forcibly ended for the time being through the APP, and please try again later, that is, the passenger may send the end billing request again via the sending module 820 through the operation performed on the terminal in the future.

Based on a demand for the server to determine whether the terminal meets the condition for ending the billing, the end billing request sent by the sending module 820 of the terminal 800 in the embodiments of the present disclosure may carry current location information of the terminal to provide the server with basic information for determination. In addition, when communication module 810 of the terminal 800 performs the card swiping operation for getting on the bus, the bus card machine may write the bus information into the terminal through the NFC communication with the communication module 810, and the end billing request sent by the sending module 820 may also carry the stored bus information, thereby determining whether the terminal meets the condition for ending the billing according to the location information of the bus and the location information of the terminal. For example, the distance between the terminal and the bus may be determined based on the location information of the terminal and the bus information. When the distance between the bus and the terminal is greater than a set distance threshold which may be set to not less than a length of the bus, and the passenger is considered to have got off the bus.

The distance threshold in the embodiments of the present disclosure may be distance information set in the server to determine whether the passenger has got off the bus. Due to different bus models, different distance thresholds may be set for different buses. The distance threshold may also be presented in the bus information in the end billing request sent by the terminal. For example, if the bus information has a bus model, the server may determine an appropriate distance threshold according to the bus model to determine whether the passenger has got off the bus.

The terminal 800 provided in the disclosed embodiments is configured to execute the method for generating billing information provided in the embodiment shown in FIG. 5 of the present disclosure, and has corresponding functional modules. The implementation principles and technical effects are similar, and will not be repeated here.

Figure 12:
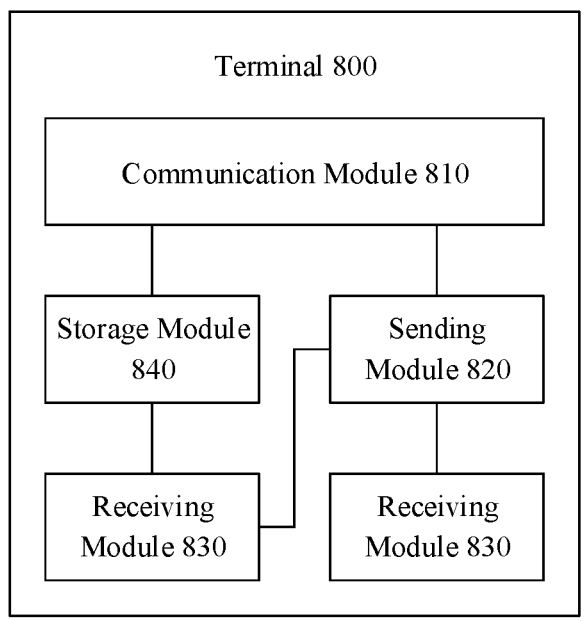
FIG. 12 is a schematic structural diagram of another terminal provided by an embodiment of the disclosure.

Optionally, FIG. 12 is a schematic structural diagram of another terminal provided by an embodiment of the present disclosure. Based on the structure of the terminal 800 shown in FIG. 11, the terminal 800 provided by the embodiments of the present disclosure may further include: a storage module 840 and a processing module 850.

The storage module 840 is configured to store the bus information when the communication module 810 performs the card swiping operation for getting on the bus.

The processing module 850 is configured to monitor whether the terminal is not in the bus and does not perform the card swiping in real time through a triggering of the card swiping operation for getting on the bus.

In the embodiments of the present disclosure, the storage module 840 is, for example, a memory, and the processing module 850 is, for example, a processor.

Optionally, in the terminal 800 provided in the embodiments of the present disclosure, the processing module 850 may include:
 a reading unit, configured to read the stored bus information in real time;
 a location obtaining unit, configured to obtain the location information of the terminal when the bus information is read by the reading unit, and obtain the location information of the bus from the server;
 a monitoring unit, configured to monitor that the terminal is not in the bus and does not perform the card swiping when the distance between the terminal and the bus is greater than the distance threshold.

Optionally, the terminal 800 provided in the embodiments of the present disclosure may further include:
 a display module 860, configured to display a prompt message for indicating that the terminal is not in the bus and does not perform the card swiping.

The terminal 800 provided in the disclosed embodiments is configured to execute the method for generating billing information provided in the embodiments shown in FIG. 6 and FIG. 7 of the present disclosure, and has corresponding functional modules. The implementation principles and technical effects are similar, and will not be repeated here.

Figure 13:
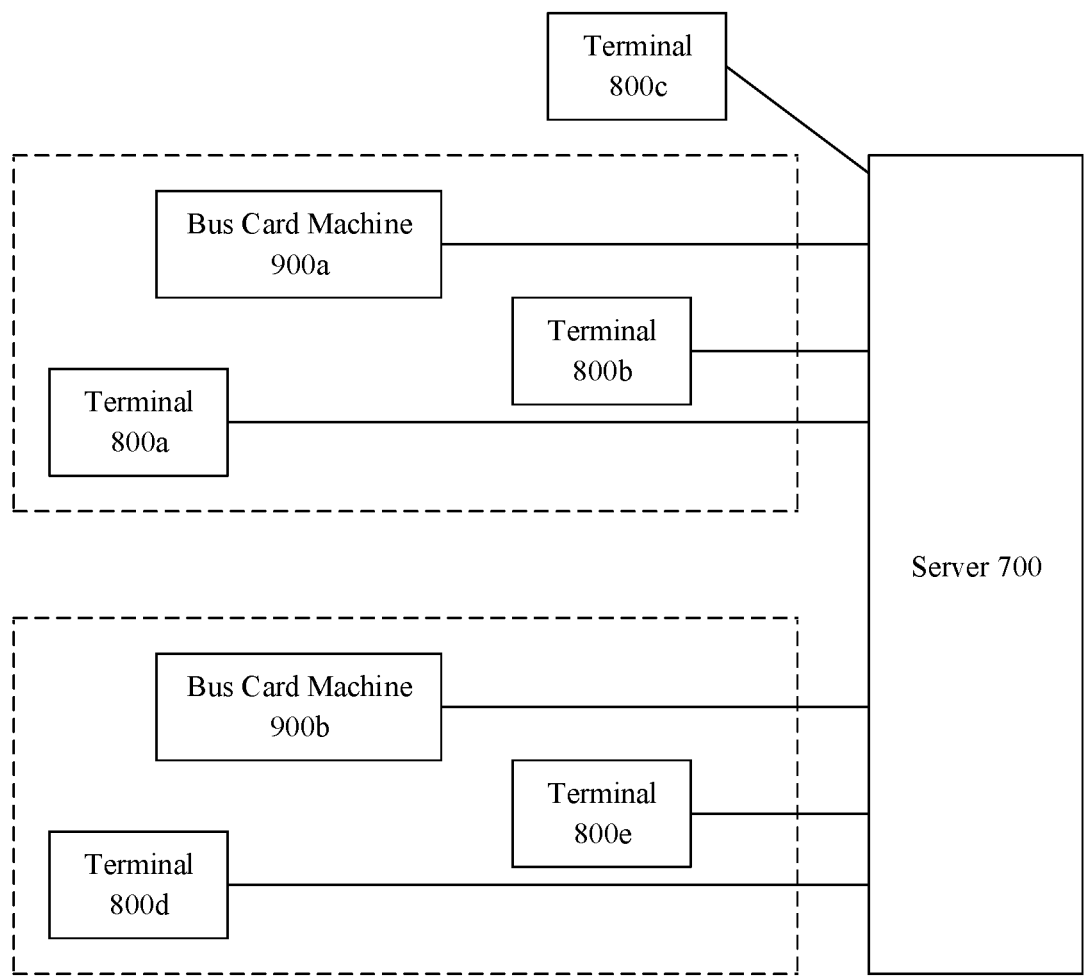
FIG. 13 is a schematic structural diagram of a system for generating billing information provided by an embodiment of the disclosure.

As shown in FIG. 13, which is a schematic structural diagram of a billing system provided by an embodiment of the present disclosure. The billing system provided by the embodiment of the present disclosure may include: the server 700 in any of the embodiments shown in FIGS. 9 and 10, the terminal 800 in any of the embodiments shown in FIGS. 11 and 12, and a bus card machine 900.

The bus card machine 900 is configured to write the bus information to the terminal 800 that performs the card swiping operation for getting on the bus, and delete the stored bus information from the terminal 800 that performs the card swiping operation for getting off the bus;
 the bus card machine 900 is also configured to upload to the server 700 information that the terminal performs the card swiping operation for getting on the bus, and the card swiping operation for getting off the bus.

In the billing system shown in FIG. 13, only the respective bus card machines 900a and 900b of the two buses are shown, and the five terminals 800a~e are shown. The current bus travel for the terminals 800a~c is to perform the card swiping operation for getting on the bus via the bus card machine 900a, and the terminal 800c is not in the bus and does not perform the card swiping. The current bus travel for the terminals 800d~e is to perform the card swiping operation for getting on the bus via the bus card machine 900b, and both the terminals 800d~e are not in the bus. In a practical application, the number of bus card machines 900 and terminals 800 is relatively large, and conditions of the terminal 800 regarding to whether it is on or off the bus is also reflected by the NFC communication with the bus card machine 900 related to the current travel. When the terminal 800 itself monitors that the distance between the terminal 800 and the bus related to the current travel is greater than the distance threshold, the passenger using the terminal 800 is prompted to initiate the end billing. A manner in which each network element performs billing in the billing system provided by the embodiments of the present disclosure is the same as a manner in which the corresponding network element performs billing in the embodiments shown in FIG. 9 to FIG. 12, and the billing system is also configured to execute the method for generating billing information provided by any of the embodiments shown in FIGS. 1 to 8, and has a corresponding physical device, and its implementation principle and technical effect are similar, and will not be repeated here.

The embodiments of the present disclosure also provide a computer-readable storage medium having executable instructions stored thereon, which, when executed by a processor, implement the method for generating billing information provided by any one of embodiments shown in FIGS. 1 to 4 of the present disclosure, or when executed by the processor, implement the method for generating billing information provided by any one of embodiments shown in FIGS. 5 to 7 of the present disclosure. The implementation of the computer-readable storage medium provided in the embodiments of the present disclosure is basically the same as method for generating billing information provided in the foregoing embodiment of the present disclosure, and will not be repeated here.

Those ordinary skilled in the art can understand that all or some of the steps in the method, functional modules/units in the system, and device disclosed above may be implemented as software, firmware, hardware, and an appropriate combination thereof. In the hardware implementation, the division between the functional modules/units mentioned in the above description does not necessarily correspond to the division of physical components; for example, one physical component may have multiple functions, or one function or step may be performed by several physical components. Some or all of the components may be implemented as software executed by a processor, such as a digital signal processor or a microprocessor, or as hardware, or as an integrated circuit, such as an application specific integrated circuit. Such software may be distributed on the computer-readable medium, and the computer-readable medium may include a computer storage medium (or a non-transitory medium) and a communication medium (or a transitory medium). As is well known to those ordinary skilled in the art, the term "computer storage medium" includes volatile and nonvolatile, removable, and non-removable medium implemented in any method or technology used to store information (such as computer-readable instructions, data structures, program modules, or other data). The computer storage medium include but are not limited to a RAM, a ROM, a EEPROM, a flash memory or other memory technologies, a CD-ROM, a digital versatile disk (DVD) or other optical disk storage, a magnetic cassette, a magnetic tape, magnetic disk storage or other magnetic storage devices, or any other medium used to store desired information and that may be accessed by a computer. In addition, as is well known to those ordinary skilled in the art, the communication medium usually contains computer-readable instructions, data structures, program modules, or other data in a modulated data signal such as carrier waves or other transmission mechanisms, and may include any information delivery medium.

In the method for generating billing information, and the terminal, the server and the billing system provided by the embodiments of the present disclosure, the server performs an end billing operation for the first terminal from which the distance to the bus is greater than the distance threshold according to the location information of the terminal and the bus information in the request by receiving the end billing request including the location information of the terminal and the bus information sent by the terminal. For a passenger who takes the bus and forgets to swipe the card when getting off the bus, the method for generating billing information provided by the embodiments of the present disclosure does not deduct the full-course travel fee. Instead, according to a location where the passenger forces to end the billing (that is, the location information of the terminal in the end billing request sent by the terminal), a cost of the corresponding station or the mileage is deducted. Compared with a billing method of deducting the full-course travel fee for the passenger who takes the bus and forgets to swipe the card when getting off the bus in the related art, the method for generating billing information provided by the embodiment of the present disclosure may greatly reduce the economic loss caused by the passenger getting off the bus and forgetting to swipe the card, and has a great market prospect.

Although the embodiments disclosed in the present disclosure are as described above, the content described is only the embodiments used to facilitate the understanding of the present disclosure, and is not intended to limit the present disclosure. Anyone skilled in the art to which the present disclosure belongs may make any modifications and changes in the implementation form and details without departing from the spirit and scope disclosed in the present disclosure. However, the protection scope of the present disclosure still requires to be defined by the appended claims.

What is claimed is:

1. A computer-implemented method for generating billing information, comprising:
   receiving, by a server remote to a public transportation, an end billing request sent by a terminal installed with an application (APP) configured to perform swiping interactive operations with the server, wherein the end billing request comprises location information of the terminal and public transportation information; and
   performing, by the server, an end billing operation for a first terminal from which a distance to public transportation is greater than a distance threshold according to the location information of the terminal and the public transportation information, and generating the billing information,
   wherein the performing the end billing operation for the first terminal from which the distance to the public transportation is greater than the distance threshold, according to the location information of the terminal and the public transportation information, and generating the billing information comprises:
      obtaining, by the server, location information of the public transportation according to the public transportation information, wherein the location information of the public transportation is obtained by the server interacting with a corresponding onboard card machine based on the public transportation information;
      determining, by the server, whether a distance between the terminal and the public transportation is greater than the distance threshold according to the location information of the terminal and the location information of the public transportation; and
      performing, by the server, the end billing operation for the first terminal from which the distance to the public transportation is greater than the distance threshold and generating the billing information, and
   wherein the end billing operation comprises instructing the terminal to clear the public transportation information, and instructing the APP to access an NFC card bound to the terminal or an NFC module in the terminal, to deduct corresponding travel cost.

2. The method according to claim 1, wherein, after the receiving the end billing request sent by the terminal, the method further comprises:
   determining whether the terminal sending the end billing request has an unfinished travel; and
   the performing the end billing operation for the first terminal and generating the billing information comprises: performing the end billing operation for the first terminal which is determined to have the unfinished travel and from which the distance to the public transportation is greater than the distance threshold and generating the billing information.

3. The method according to claim 1, further comprising: sending billing result information to the terminal and generating the billing information according to the billing result information, wherein the billing result information comprises end billing information sent to the first terminal or a refusal end billing message sent to a second terminal from which a distance to the public transportation is less than or equal to the distance threshold.

4. A server, comprising: a memory and a processor; wherein:
   the memory is configured to store executable instructions; and
   the processor is configured to implement the method according to claim 1 when executing the executable instructions stored in the memory.

5. A system for generating billing information, comprising:
   the server according to claim 4, and a card machine in public transportation;
   wherein the card machine in the public transportation is configured to write public transportation information to a terminal that performs a card swiping operation for getting on the public transportation, and delete stored public transportation information from a terminal that performs a card swiping operation for getting off the public transportation; and wherein the card machine in the public transportation is also configured to upload information that the terminal performs the card swiping operation for getting on the public transportation and the card swiping operation for getting off the public transportation to the server, wherein an end billing request is sent by the terminal to the server, and the end billing request comprises location information of the terminal and public transportation information, the public transportation information is information in a current travel of the terminal;

and billing result information returned by the server is received and the billing information is generated according to the billing result information, and the billing result information comprises end billing information or a refusal end billing message, and the end billing information is sent to the terminal after it is determined that a distance between the terminal and the public transportation is greater than a distance threshold according to the location information of the terminal and the public transportation information and end billing operation is performed for the terminal by the server.

6. A computer-implemented method for generating billing information, comprising:

sending, by a terminal installed with an application (APP) configured to perform swiping interactive operations with a server, an end billing request to the server remote to a public transportation, wherein the end billing request comprises location information of the terminal and public transportation information, and the public transportation information is information in a current travel of the terminal; and receiving billing result information returned by the server, and generating the billing information, wherein the billing result information comprises end billing information or a refusal end billing message, and the end billing information is sent to the terminal after it is determined that a distance between the terminal and a public transportation is greater than a distance threshold according to the location information of the terminal and the public transportation information and end billing operation is performed for the terminal by the server, and wherein the end billing operation comprises obtaining, by the server, location information of the public transportation according to the public transportation information, wherein the location information of the public transportation is obtained by the server interacting with a corresponding onboard card machine based on the public transportation information; determining, by the server, whether a distance between the terminal and the public transportation is greater than the distance threshold according to the location information of the terminal and the location information of the public transportation; and performing, by the server, the end billing operation for the first terminal from which the distance to the public transportation is greater than the distance threshold and generating the billing information, and wherein after receiving the end billing information, the terminal is instructed by the end billing information to clear the public transportation information, and instructing the APP to access an NFC card bound to the terminal or an NFC module in the terminal, to deduct corresponding travel cost.

7. The method according to claim 6, wherein, before the sending the end billing request to the server, the method further comprises:

performing a card swiping operation for getting on the public transportation, and storing the public transportation information; and monitoring whether the terminal is not in the public transportation and does not perform the card swiping in real time through a triggering of the card swiping operation for getting on the public transportation.

8. The method according to claim 7, wherein the monitoring whether the terminal is not in the public transportation and does not perform the card swiping in real time comprises:

reading the stored public transportation information in real time;

obtaining the location information of the terminal and obtaining location information of the public transportation from the server, when the public transportation information is read; and determining that the terminal is not in the public transportation and does not perform the card swiping when the distance between the terminal and the public transportation is greater than the distance threshold.

9. The method according to claim 7, further comprising: displaying a prompt message for indicating that the terminal is not in the public transportation and does not perform the card swiping.

10. A terminal, comprising: a memory and a processor; wherein:

the memory is configured to store executable instructions; and the processor is configured to implement the method according to claim 6 when executing the executable instructions stored in the memory.

* * * * *